United States Patent [19]

Savar

[11] Patent Number: 4,727,243
[45] Date of Patent: Feb. 23, 1988

[54] FINANCIAL TRANSACTION SYSTEM
[75] Inventor: Eugene Savar, Atco, N.J.
[73] Assignee: Telenet Communications Corporation, Reston, Va.
[21] Appl. No.: 664,224
[22] Filed: Oct. 24, 1984
[51] Int. Cl.⁴ .............................................. G06F 15/30
[52] U.S. Cl. ..................................... 235/379; 235/380
[58] Field of Search ................................ 235/379, 380

[56] References Cited

U.S. PATENT DOCUMENTS

| | | | |
|---|---|---|---|
| 4,270,042 | 5/1981 | Case | 235/379 |
| 4,321,672 | 3/1982 | Braun et al. | 235/379 |
| 4,355,369 | 10/1982 | Garvin | 235/379 |

Primary Examiner—Harold I. Pitts
Attorney, Agent, or Firm—Leitner, Greene & Christensen

[57] ABSTRACT

A financial transaction system makes use of an automated terminal or terminals in communication with a host computer which is capable of accessing any of a number of institutionalized or private label credit/debit card data bases, check verification data bases, and institutionalized automated clearing houses in accordance with records developed at the terminal as interpreted by the host computer. The terminal is capable of entering data identifying the credit/debit card provided by the customer, or the number of an offered check, in combination with financial information supplied by the retail merchant, to access a host computer which organizes the information supplied in addition to accessing the desired data base to determine whether or not the proposed transaction should be accepted or rejected. Operation of the terminal, as complemented by operation of the host computer with which it communicates, also enables the merchant's financial transactions to be monitored and recorded throughout a given business day, making the host computer available to assist the retail merchant in collecting, organizing, resolving and settling a day's receipts in automated fashion, for prompt and accelerated payment.

30 Claims, 25 Drawing Figures

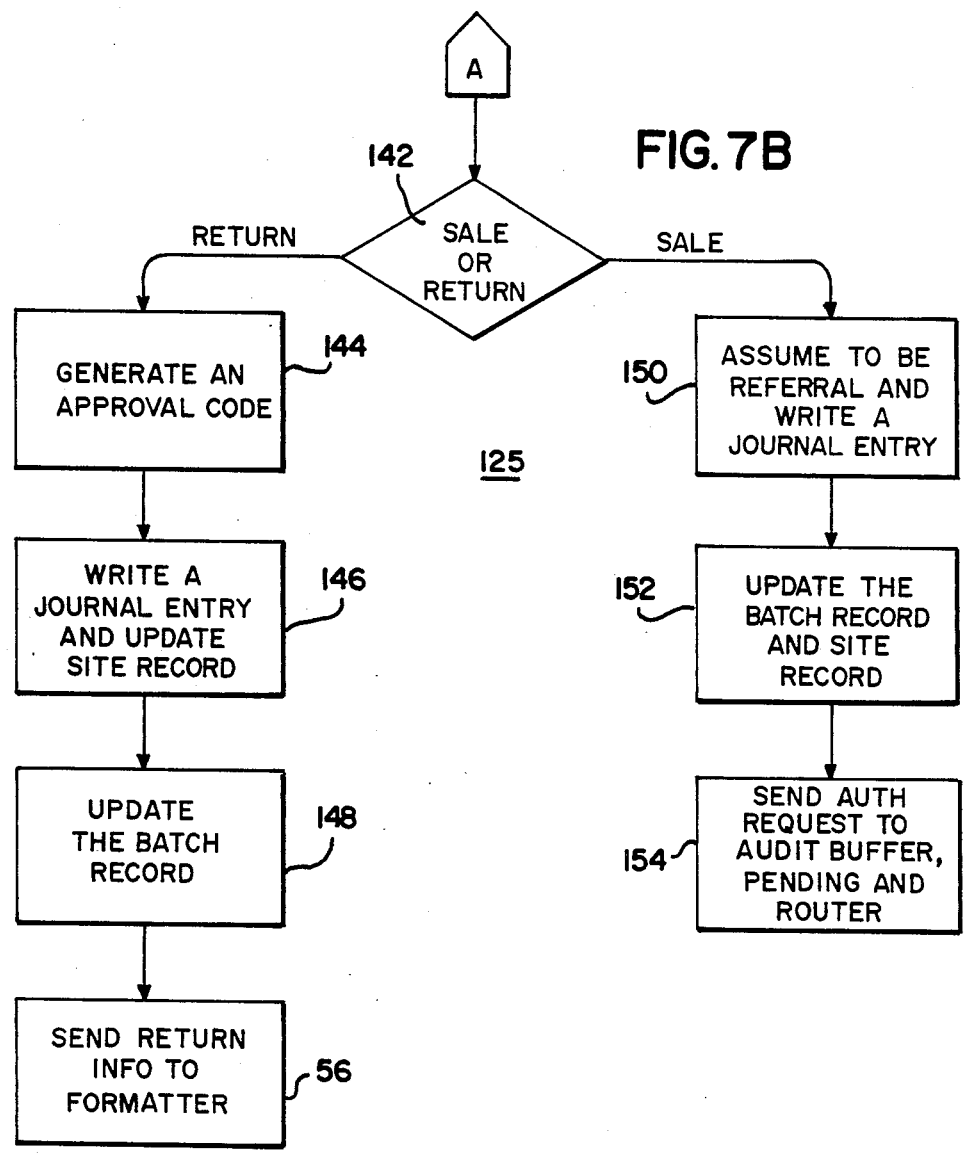

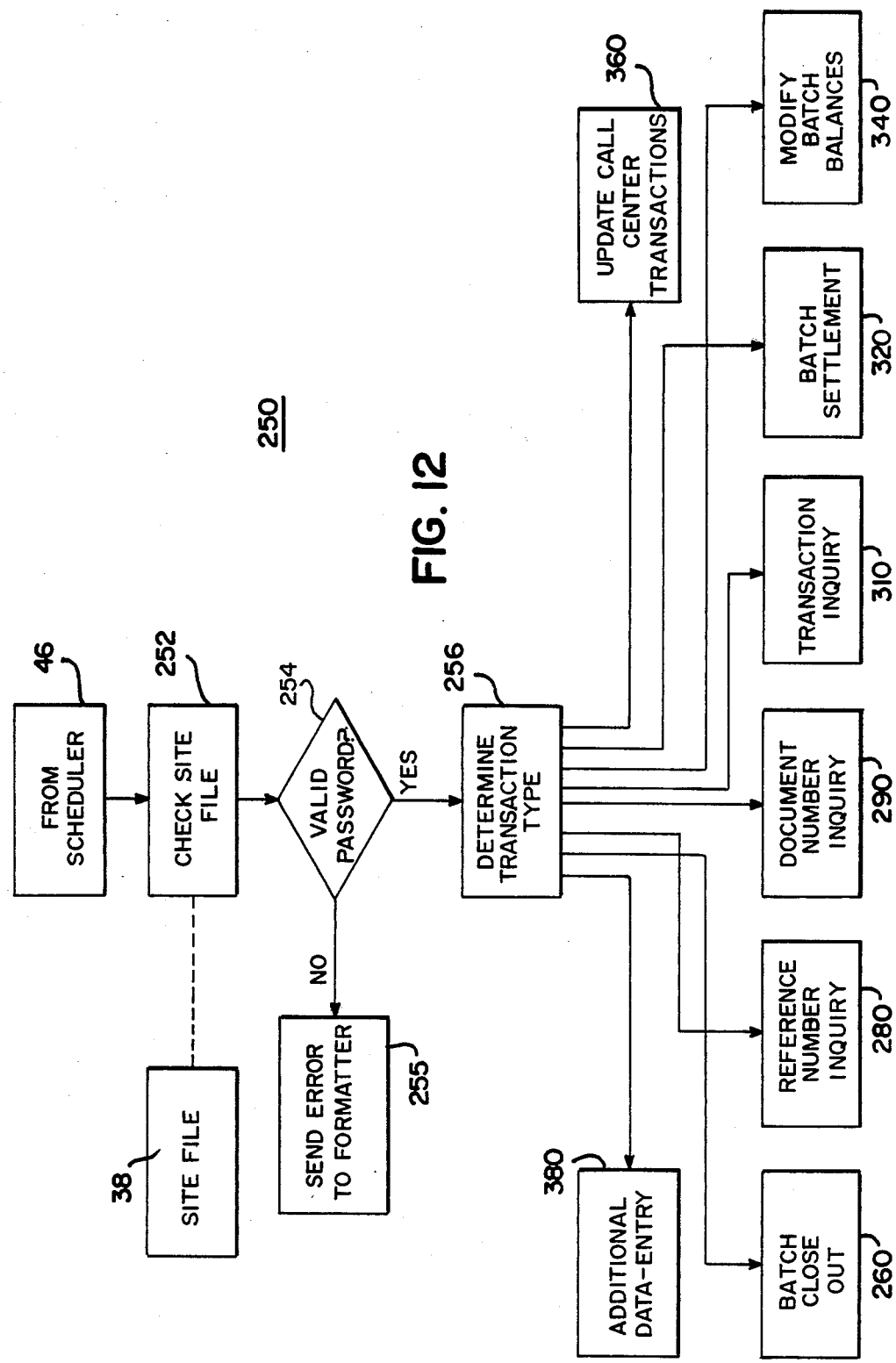

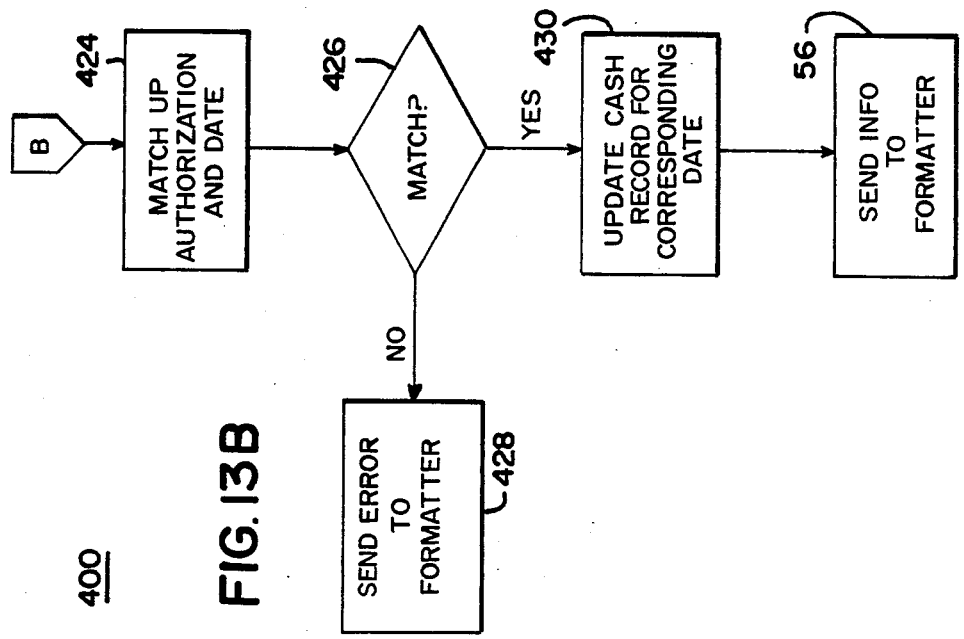
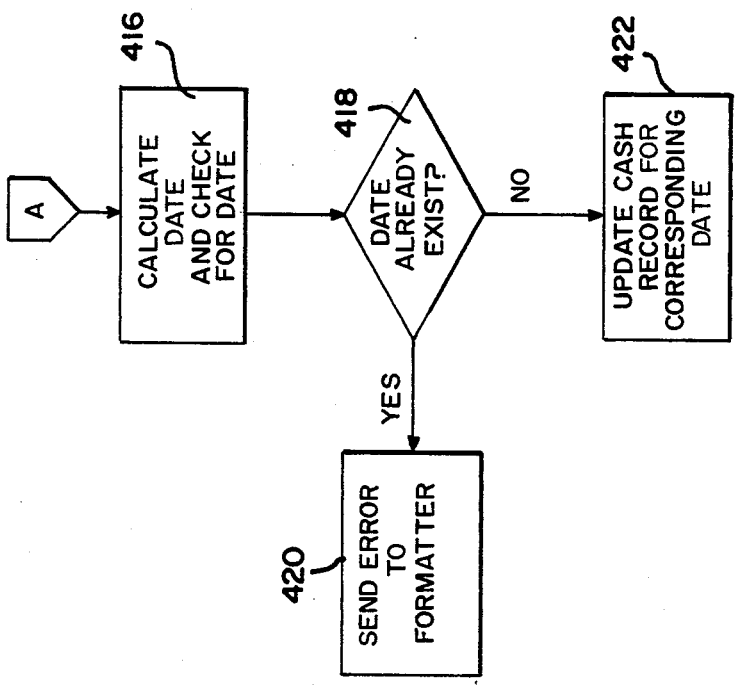
FIG. 13B

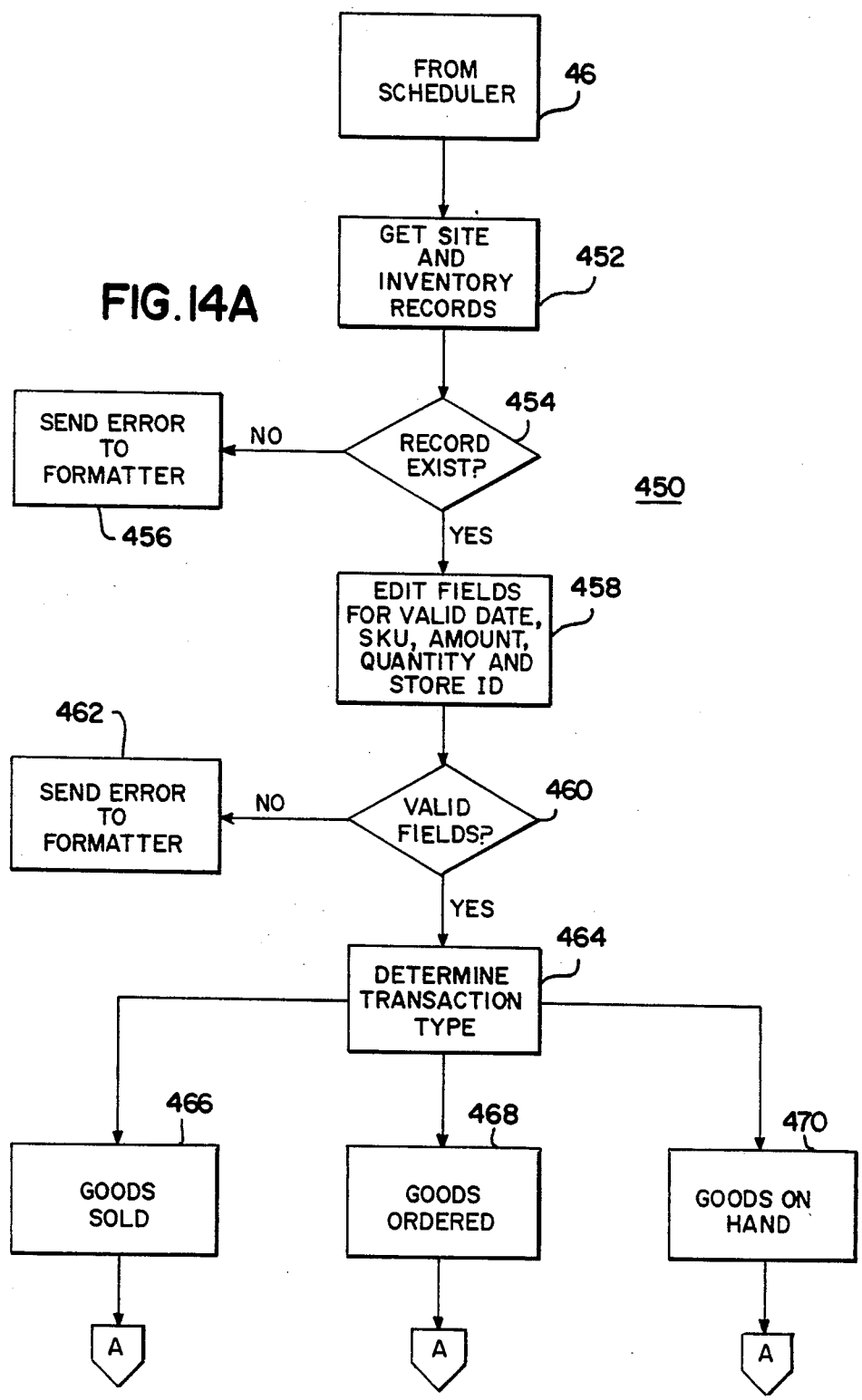

FINANCIAL TRANSACTION SYSTEM

BACKGROUND OF THE INVENTION

The present invention relates generally to financial transaction sytems, and in particular, to a multi-faceted financial transaction system for use by retail establishments.

Irrespective of size, retail establishments must take into account of a variety of financial considerations in their day-to-day operations. Apart from the requirements of maintaining an appropriate inventory, and appropriate cash management, more often than not a retailer is required to accept payment for goods sold or services rendered by means of credit card or other noncash transaction devices. This may include the acceptance of institutionalized credit cards, such as are provided through credit card services including "Visa", "Mastercard", "American Express", "Diner's Choice", and so on. For larger retail establishments, this may even include the acceptance of so-called "private label" credit cards which are distributed by the retail establishment for use by its customers. As another consideration, it is not uncommon for retail establishments to accept personal checks in payment for goods and services.

In accepting any or all of these forms of alternative payment, it is important that a retail establishment be assured that the line of credit extended in connection with the credit card offered is sufficient to cover the charge incurred and that the customer is current in payments made to the credit card service, or that the customer's checking account is sufficient to warrant acceptance of a personal check. For this reason, a variety of services have been established which enable a retailer to verify the validity of a credit transaction. Particularly in the case of credit cards, this may include the circulation of pamphlets or other listings indicating the number of credit cards which are not to be honored for various reasons, including poor credit risk and theft. However, such listings are generally cumbersome in use, and exhibit an inherent time lag between distribution of the pamphlets and their actual use which can result in the posting of a charge to an account which should not properly have been honored. Also to be considered is that such systems are not readily applicable to the verification of personal checks.

As a result, a variety of automated systems have been developed which enable a retail merchant to communicate with the company issuing the credit card, or a company which will guaranty the personal check, to obtain an immediate indication as to whether or not the credit card/check should be accepted or rejected. Such systems may take the form of a clearing house which can be contacted by telephone to provide a credit card/check number for verification against listings maintained at the clearing house. More recently, such voice communications have been replaced with automated systems which enable magnetic markings provided on the credit card/check to be read automatically, and which automatically access a data base for interrogation as to whether or not the credit card/check may be accepted.

While reducing the need for human intervention in the verification of credit transactions to the extent possible, and improving reliability by decreasing delays between compilation of a listing of unacceptable numbers and accessing of the compiled listing, such systems are still subject to a number of drawbacks.

For example, many times it is necessary to have available a different remote terminal for accessing each of the several data bases which are available for credit verification. This may include separate terminals capable of accessing the various institutionalized credit card systems available, a separate terminal for accessing a private label credit card system, and a separate terminal for accessing a check guarantee system. This is clearly duplicative in cost, presenting the merchant with a significant capital expenditure which may not be justified in relation to the volume of business handled by such means of alternative payment.

It will further be noted that such systems make no accommodations for other improvements in cash management which have recently come into existence. One such consideration relates to the availability of debit cards, which would allow the retail merchant to obtain direct payment for goods or services from the customer's bank account by means of an automated clearing house system. Although several such debit card systems have been made available for use by various institutions, as well as some larger retailers, available credit verification systems do not accommodate such functions, requiring that yet another terminal be kept on hand to provide such a feature.

Another consideration is that such credit verification systems in no way assist the retailer in accelerating payment for the goods sold or services rendered. To obtain payment, the retail merchant is constrained to await processing of the credit transaction slips which are used to memorialize the various transactions entered into in the course of a business day, leading to delays in payment which can be as much as two weeks in duration. It will be understood that such a line of credit represents a significant cost in operation. The primary reason for this delay is that existing credit verification systems are dependent upon verification of the many transaction slips produced in the course of operations, since such slips represent the only record of the transactions entered into. Thus, ultimate payment is subject to delays inherent in hand sorting and tallying the slips, and in forwarding the tallied slips to the credit agency for eventual verification and processing.

Another consideration is that such credit verification systems merely serve to verify the validity of a transaction and in no way assist in recording the transaction, or settling recorded transactions against the merchant's records. Thus, before assembling slips for eventual payment as previously described, the retail merchant must first collect and resolve the various transactions entered into by hand, with no assistance in the location of erroneous entries which prevent balancing and settlement.

It has therefore remained desirable to develop a financial transaction system which is capable of handling the various credit/debit/checking instruments which are used in connection with current credit transactions by means of a single communicating terminal, and which is also capable of recording such credit transactions for expediting resolution and settlement of the transactions entered into as well as accelerating payment for such transactions by the various credit agencies subscribed to.

SUMMARY OF THE INVENTION

It is therefore a primary object of the present invention to provide a financial transaction system of improved scope and versatility.

It is also an object of the present invention to provide a financial transaction system which is capable of handling various credit/debit/checking instruments in automated fashion.

It is also an object of the present invention to provide a financial transaction system which makes use of a single terminal to access data bases representative of the various credit/debit/checking instruments which are to be handled.

It is also an object of the present invention to provide a financial transaction system which is capable of providing the foregoing functions, and which is further capable of recording the financial transactions occurring throughout a particular business interval.

It is also an object of the present invention to provide a financial transaction system which is capable of providing the foregoing functions, and which is capable of recording financial transactions in a manner which enables accelerated repayment for credit extended.

It is also an object of the present invention to provide a financial transaction system which is capable of providing the foregoing functions to assist a retail merchant in periodically organizing and resolving financial transactions in a simple and straightforward manner.

These and other objects are achieved in accordance with the present invention by providing the retail merchant with an automated terminal or terminals in communication with a host computer which is capable of accessing any of a number of institutionalized or private label credit/debit card data bases, check verification data bases, and institutionalized automated clearing houses in accordance with records developed at the terminal as interpreted by the host computer.

The terminal preferably incorporates means for entering data identifying the credit/debit card provided by the customer, or the number of an offered check, in combination with financial information supplied by the retail merchant, to access a host computer which organizes the information supplied in addition to accessing the desired data base to determine whether or not the proposed transaction should be accepted or rejected. Since it is the host computer which communicates with the various data bases involved rather than the terminal, any formatting necessary to enable communication with a particular data base is provided by the host computer, enabling a single terminal provided at the retail merchant's establishment to access the various data bases subscribed to rather than requiring multiple terminals to accommodate different data base formats. This enables access of institutionalized credit/debit card systems, private label credit/debit card systems, as well as check verification systems from a single terminal unit.

Operation of the terminal, as complemented by operation of the host computer with which it communicates, also enables the retail merchant's financial transactions to be monitored and recorded throughout a given business day. This makes the host computer available to assist the retail merchant in collecting, organizing, resolving and settling a day's receipts in automated fashion for direct submission to receive prompt and accelerated payment, rather than waiting for written supporting documents to be organized, transferred and verified.

For further detail regarding a preferred embodiment financial transaction system in accordance with the present invention, reference is made to the following detailed description, taken in conjunction with the following illustrations.

BRIEF DESCRIPTION OF THE DRAWINGS

FIGS. 7A and 7B collectively show a schematic diagram which provides expanded flow charting of a first server selectable by means of the scheduler of FIG. 2 and which is used in seeking authorization of credit transactions.

FIG. 12 is a schematic diagram which provides expanded flow charting of a fourth server selectable by means of the scheduler of FIG. 2 and which is used in capturing and organizing credit transactions for a given period of time, for subsequent resolution and settlement.

FIGS. 13A and 13B collectively show a schematic diagram which provides expanded flow charting of a fifth server selectable by means of the scheduler of FIG. 2 and which is used in providing a cash management capability.

FIGS. 14A and 14B collectively show a schematic diagram which provides expanded flow charting of a sixth server selectable by means of the scheduler of FIG. 2 and which is used in providing an inventory tracking capability.

In the several views provided, like reference numerals denote similar structure.

DETAILED DESCRIPTION OF THE PREFERRED EMBODIMENT

Figure 1:
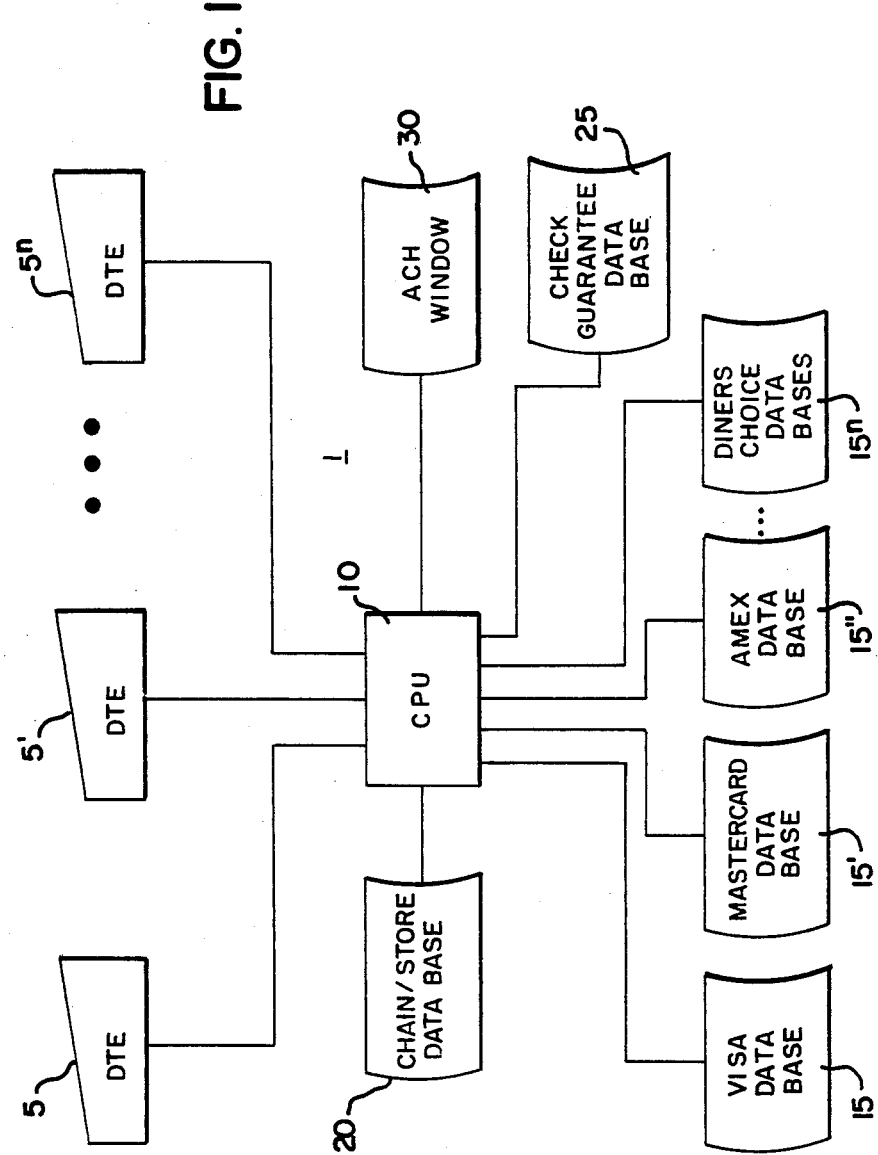
FIG. 1 is a schematic diagram providing a general overview of a financial transaction system in accordance with the present invention.

Although specific forms of the invention have been selected for illustration in the drawings, and the following description is drawn in specific terms for the purpose of describing these forms of the invention, this description is not intended to limit the scope of the invention which is defined in the appended claims.

FIG. 1 provides a general overview of the financial transaction system 1 of the present invention. In essence, the financial transaction system 1 comprises one or more terminals 5, 5' . . . $5^n$ (e.g., a dial-up terminal, an electronic cash register, a leased line terminal, etc.) in communication with a central processing unit 10 (e.g., Tandem Model TNS-1) incorporating means for interpreting data received from the terminals 5, 5' . . . $5^n$ for interactive communication with one or more data bases, including institutionalized credit card data bases 15, 15', 15'' . . . $15^n$, a private label data base 20, a check guarantee data base 25, and an automated clearing house 30. It will be understood that any of a number of terminals 5, 5' . . . $5^n$ may be operatively coupled to either a single central processing unit 10 or a multiplicity of such central processing units, as desired, accommodating not only smaller retail establishments, but larger chain establishments as well. It will further be understood that central processing unit 10 may communicate with any of a number of data bases including the various data bases illustrated in FIG. 1, as well as other data bases which are available in accomplishing various financial transactions.

Communication between the central processing unit 10 and a given terminal 5, a data base 15, 20, 25, or an automated clearing house 30 may be established using any of a variety of conventional communications techniques, preferably by means of telephone lines, either dedicated or non-dedicated. The information transmitted, upon appropriate formatting, may be transferred either by means of a multiplexing system, a packet switching system, etc., with packet switching systems being preferred in this regard. Of course, selection of the means used to establish communication between the various components above described will depend upon the quantities and nature of the information to be transferred between the several components illustrated, as well as the number of components which are to comprise a given system.

Figure 2:
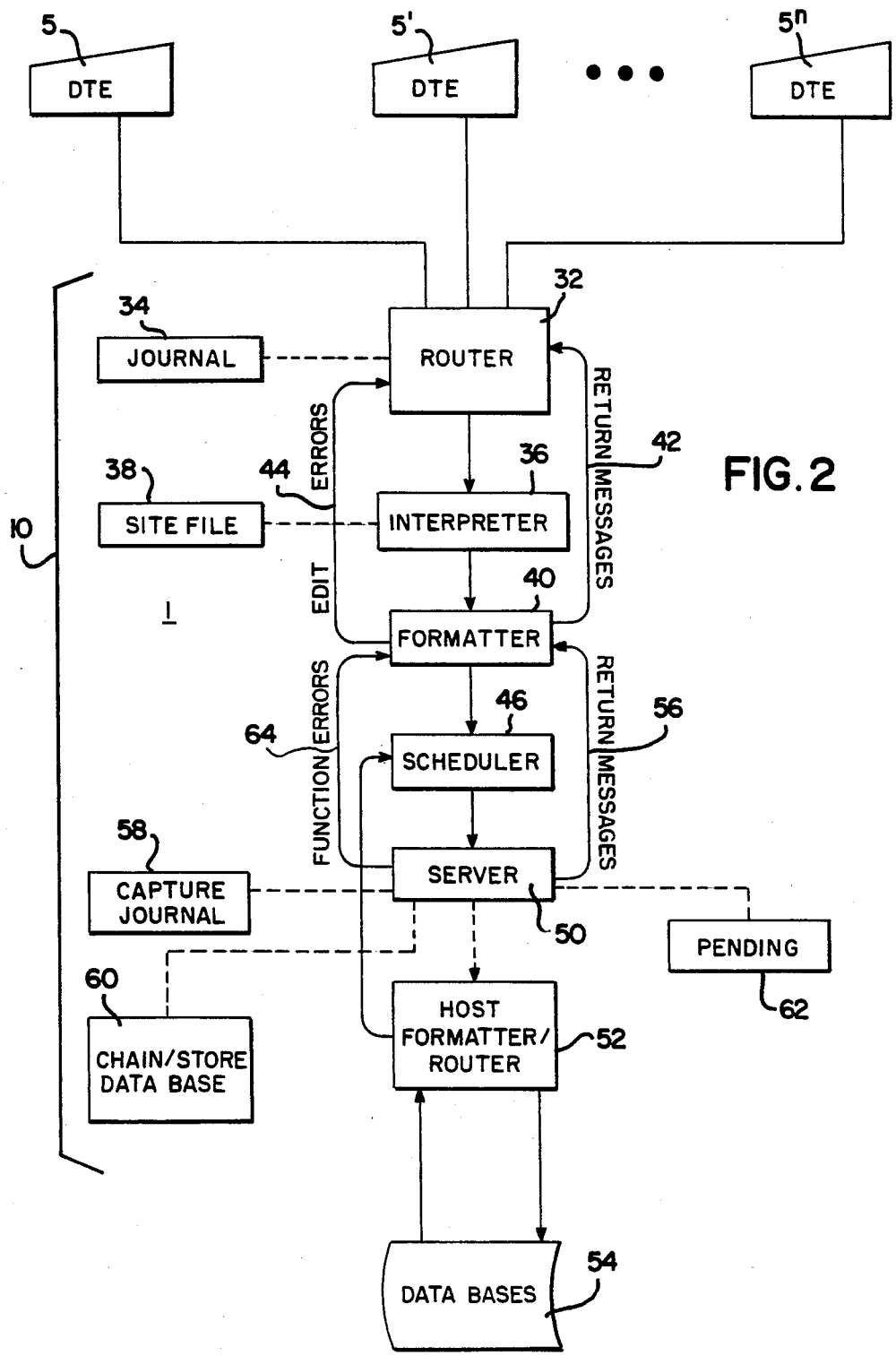
FIG. 2 is a schematic diagram providing an overview of the flow of information within the financial transaction system.

FIG. 2 is a flow chart providing a general overview of the manner in which information is processed by means of the financial transaction system 1 of the present invention. Information from one or more data terminals 5, 5' . . . $5^n$ is introduced to central processing unit 10 by means of router 32, which controls the transfer of data from the several data terminals 5, 5' . . . $5^n$ to the central processing unit 10, as well as enabling the central processing unit 10 to communicate with the various data terminals 5, 5' . . . $5^n$, as will be described more fully below. Router 32 is operatively associated with a journal 34 which records each of the transactions (incoming and outgoing) processed by the router 32, providing a sequential record of communications between the router 32 and the several data terminals 5, 5' . . . $5^n$.

Router 32 is operatively coupled to an interpreter 36 which accepts information received by the central processing unit 10 for cross-referencing with information contained in a site file (customer) data base 38 which maintains a record of customer sites associated with the system, their respective characteristics, and the particular services which are subscribed to. The cross-referenced data is then made part of the message being operated upon, and is delivered to a formatter 40.

Formatter 40 provides a number of operational functions. For example, formatter 40 is used to receive data from interpreter 36 and to convert the received data from a format which is used by the data terminals 5, 5' . . . $5^n$ in communicating with the central processing unit 10 (an external format) to a format which is used by the central processing unit 10 in subsequent processing and storage (an internal format). Formatter 40 is also used to convert data developed by central processing unit 10 from its internal format to an external format for delivery to router 32 by means by flow path 42, for transfer to the data terminals 5, 5' . . . $5^n$. As will be described more fully below, central processing unit 10 makes use of a number of testing functions which determine whether data to be processed has been properly entered and assembled for processing by the central processing unit 10. If not, descriptive error messages indicating the fault detected are directed to router 32 by means of flow path 44, for transfer to the data terminals 5, 5' . . . $5^n$ for display to an operator.

Internally formatted messages developed by formatter 40 are in turn transferred to a scheduler 46 which interprets the message received to determine the nature of the operation to be performed and to responsively select an appropriate server 50, as will be discussed more fully below, for processing the data received. Scheduler 46 also performs the function of load balancing by enabling loads to be shifted between the various servers developed in the course of system operation. Upon selection of an appropriate server 50, the internally formatted data is appropriately processed and stored. Depending upon the particular task to be performed, server 50 is capable of communicating with a variety of ancillary operation elements to facilitate such processing, as follows.

A host formatter/router 52 is provided to receive information processed by server 50, for re-formatting and routing to a selected remote data base 54. Although only a single data base 54 is illustrated in FIG. 2, it will be understood that data base 54 in fact represents any of a number of accessible data bases useful in connection with financial transactions of the type addressed in the present application, including data bases such as are currently available in connection with any of a number of institutionalized credit/debit card systems, private label credit/debit card systems, check acceptance systems, etc. It will be noted that communications between host formatter/router 52 and data base 54 occur in both directions, since it is necessary to not only send an inquiry to the data base 54, but also to receive information from the data base 54 for subsequent processing by central processing unit 10 (flow path 55), or for appropriate distribution to the data terminals 5, 5' ... 5ⁿ (flow path 56). In the case of information to be returned to the data terminals 5, 5' ... 5ⁿ, it will be noted that such information is first appropriately formatted (formatter 40), and thereafter returned to the appropriate data terminal along flow path 42 as previously described.

Another function of server 50 is to appropriately store and retain transactional information for subsequent operations as will be more fully described below. To this end, a capture journal 58 is provided which maintains a listing of transactions entered into by a particular retail establishment for a given period of time, and a retail establishment data base 60 which codifies the various retail establishments forming the system, including categorization of the terminal or terminals associated with each retail establishment, as well as the services subscribed to in connection with each such terminal.

Also associated with server 50 is a pending function 62 which takes steps to assure that a particular operation of server 50 does not extend beyond an acceptable period of time, indicating a functional error as will be more fully described below. This and other functional errors are descriptively indicated to an operator at data terminals 5, 5' ... 5ⁿ, traversing flow path 64 and entering formatter 40 for appropriate conversion and transmission to the router 32 along flow path 44 as previously described.

Having provided a brief overview of the financial transaction system 1 of the present invention, each of the operational units previously referred to will now be described in further detail with reference to FIGS. 3–14, providing an illustration of the manner in which the various operational units of the financial transaction system 1 of the present invention cooperate to provide a retail establishment with the various functions which are required in its day-to-day operations.

FIGS. 3–6 illustrate portions of the financial transaction system 1 which properly interface the data terminals 5, 5' ... 5ⁿ and the servers 50 for the processing of data as will be more fully described below.

Figure 3:
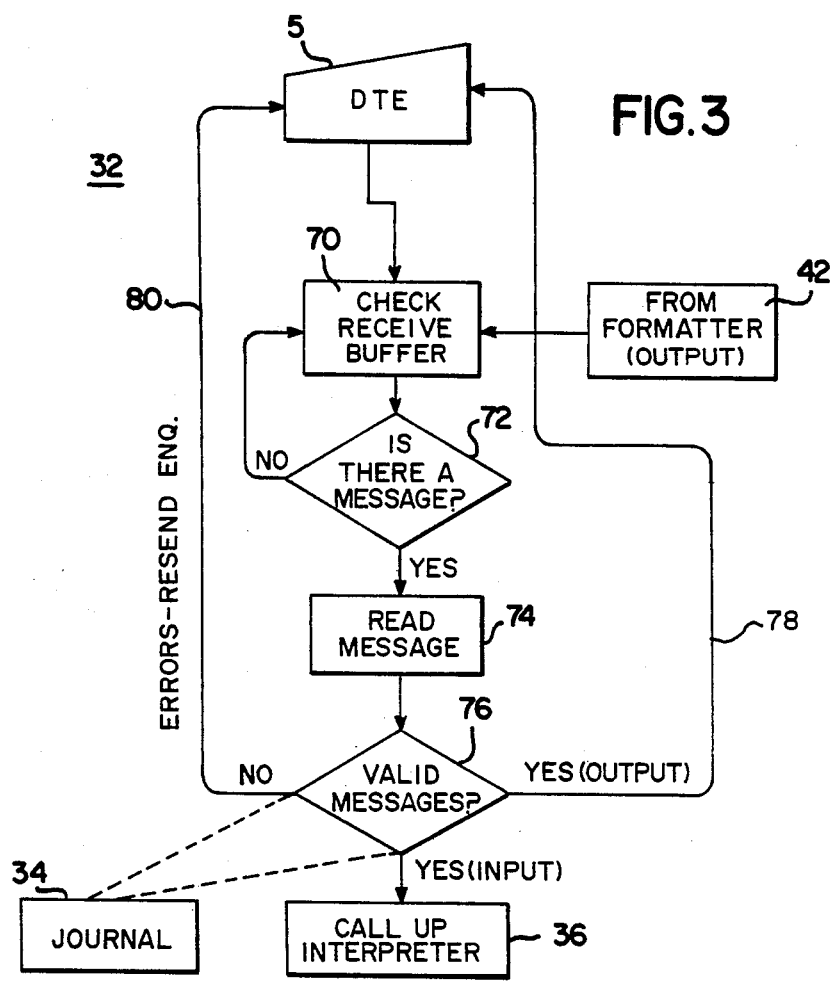
FIG. 3 is a schematic diagram which provides expanded flow charting of the router of FIG. 2.

FIG. 3 illustrates the router 32 which is used to control interactive communications between the data terminals 5, 5' ... 5ⁿ and the central processing unit 10. Of course, the router 32 selected for use in conjunction with a particular system will be appropriately matched to the type of data communications which are used to establish contact between the data terminals and the central processing unit, such as, for example, dial-up terminals, packet switching networks, authorization networks and the like. If desired, more than one router 32 may be used to interface with different types of data communications systems. Any number of terminals 5, 5' ... 5ⁿ may be coupled to the central processing unit 10 by means of the router 32, as necessary. However, for simplicity, only a single terminal 5 has been shown in association with the router 32 for the purposes of the following description.

In operation, inputs initiated from a data terminal are temporarily received and retained within a buffer 70. Router 32 periodically reviews the buffer 70, at 72, to determine if a message has been placed in the buffer 70, indicating desired initiation of a transaction. If not, periodic reviews are performed until such time as a message is detected within buffer 70.

Upon detection, the message received in buffer 70 is read into the system at 74. Upon reading the message at 74, router 32 applies an audit buffer to the message which provides the message with certain identifying information to facilitate subsequent handling of the message. To this end, the audit buffer may include any of a variety of information fields, many of which will be addressed below, preferably as a prefix to the message read. Examples of information fields which the audit buffer may add to the message received include information such as intended routing of the message received (either subsequent routing or previous routing), a logging of time, an indication of the type of data terminal addressed, the network used to accomplish data communications, etc.

After being provided with the audit buffer, the message is then tested at 76 to verify that the message received is a valid one. Such testing may constitute a parity check, a verification of protocol, etc. All messages tested at 76 are simultaneously entered into the journal 34 to provide a listing of all messages processed by the system including both valid and invalid messages received by the router 32, as well as messages which are to be transmitted from the router 32 to the data terminal 5.

In the event that router 32 receives a message which is determined to be invalid, a signal (ENQ) is transmitted to the data terminal 5, at 80, to again interrogate the data terminal 5 in an effort to rectify a transmission error. If the message received is determined to be valid, and the message is an input (as determined from the audit buffer), the message is then delivered to interpreter 36 for subsequent processing. If the message is determined to be valid, but is an output, the message is communicated, via 78, to data terminal 5 for appropriate display.

Figure 4:
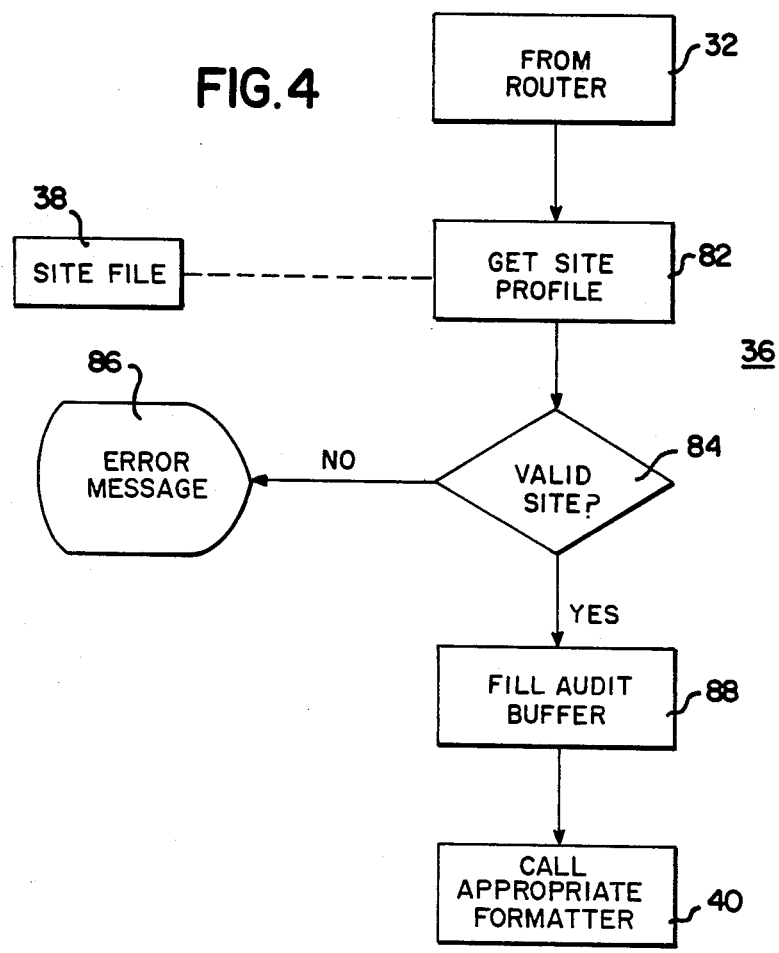
FIG. 4 is a schematic diagram which provides expanded flow charting of the interpreter of FIG. 2.

With reference to FIG. 4, upon receiving a message from the router 32 the interpreter 36 operates to obtain a site profile for the data terminal 5 which has supplied the message. Such data is obtained at 82 from the site file 38 which contains pertinent information such as the particular services which are subscribed to in connection with the data terminal 5, as well as information identifying the type of terminal and any passwords which are necessary to access the system as will be more fully described below. Before the site profile is made part of the message, the message received from the router 32 is tested against the data in the site profile, at 84, to determine whether or not the site of the data terminal 5 is a valid one. If not, an error message is developed at 86, which error message is displayed at the central processing unit 10 as opposed to the data terminal 5. This is because an incorrect site entry is an unusual occurrence which indicates either incorrect programming of the data terminal 5, or an attempt to improperly access the financial transaction system 1. Either occurrence requires special attention and is therefore displayed to an operator of the financial transaction system 1 rather than the data terminal 5. If the site is determined to be a valid one, the information obtained from the site file 38 is then added to the message at 88, including the application of data to the audit buffer which precedes the message received, as well as the addition of a site file to the message, preferably as a suffix. The message is then transferred to the formatter 40.

Figure 5:
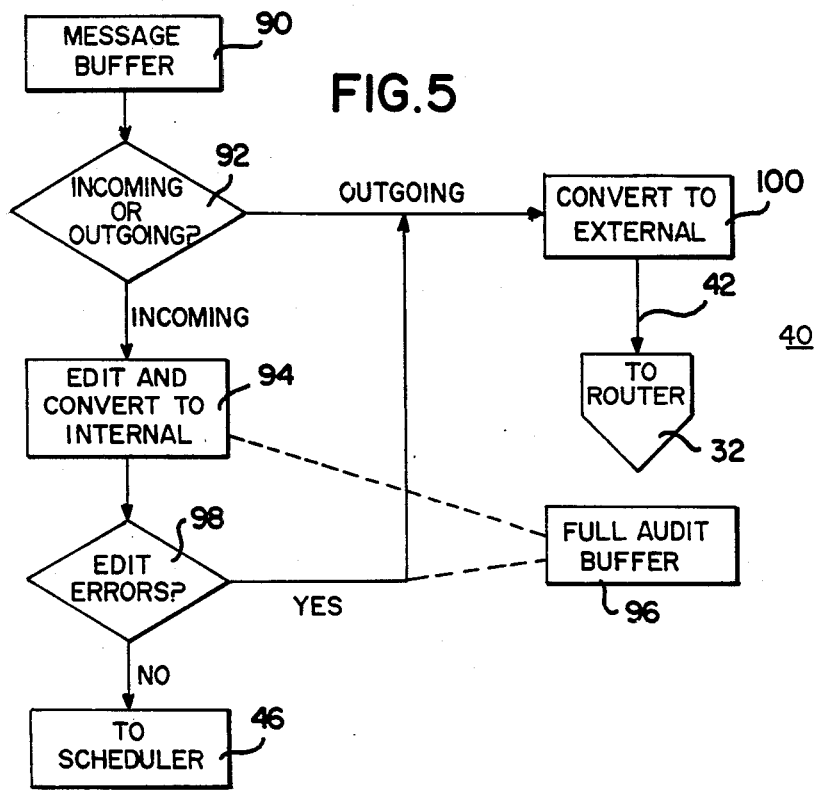
FIG. 5 is a schematic diagram which provides expanded flow charting of the formatter of FIG. 2.

With reference to FIG. 5, messages received from interpreter 36 are introduced into a message buffer 90 which serves as a means for temporarily storing the many messages received, both incoming and outgoing, for sequential delivery to the formatter 40 for appropriate conversion. In their processing, messages stored in buffer 90 are first tested at 92 to determine whether the message being operated upon is an incoming or an outgoing message.

In the event that the message is an incoming one, converter 94 edits the message so as to convert (or translate) the format of the message from the external format which is used by the data terminal 5 to the internal format which is recognized by the central processing unit 10. These formats would of course depend upon the characteristics of the data terminal 5 and the central processing unit 10, and will therefore vary with a particular application, as will formatter 40. Also at this time, the audit buffer is correspondingly modified at 96.

The converted message is then tested at 98 for editing errors, to determine if the conversion has been correctly accomplished. If no errors are detected, the converted message is then transferred to scheduler 46 for subsequent processing. If errors are detected, the message is returned to the data terminal 5 as an error. To accomplish this, the message containing the error is delivered to converter 100, which serves to convert the format of the message from the internally recognizable format to the externally recognizable format for the particular data terminal 5, and the audit buffer is again modified at 96 to ready the message for return to the data terminal 5.

If test 92 determines that an outgoing message is to be supplied to data terminal 5, or if an error has been detected, a suitably converted message (converter 100) is returned to router 32 along flow path 42 (See FIG. 3), for delivery to buffer 70 and subsequent transmission to the data terminal 5 via return path 78 as previously described.

Figure 6:
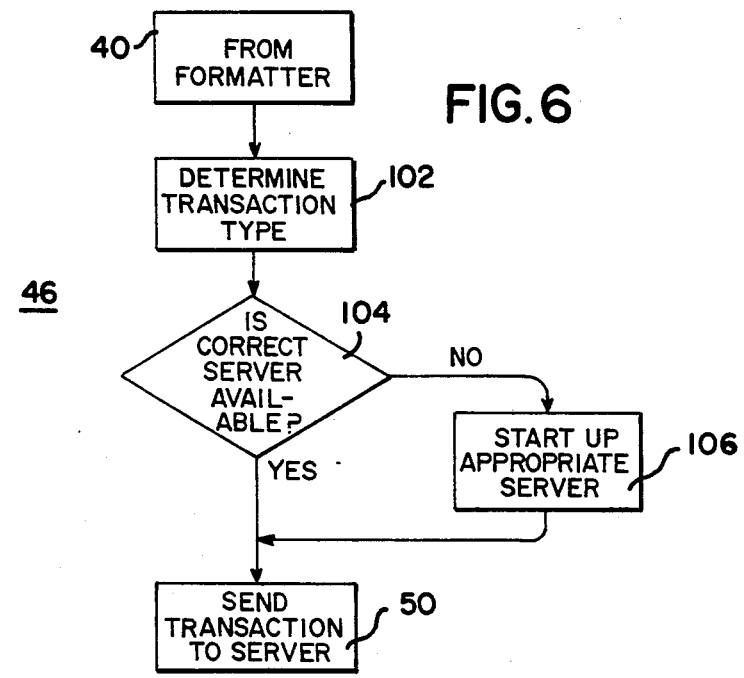
FIG. 6 is a schematic diagram which provides expanded flow charting of the scheduler of FIG. 2.

With reference to FIG. 6, messages delivered to scheduler 46 are first reviewed at 102 to determine the type of transaction which is to be processed, by reviewing the status information which is provided in the audit buffer. Upon determining the nature of the transaction to be processed, a test 104 is conducted to determine if the particular server 50 which is required to perform the function desired is available to handle the transaction. If so, the message is delivered to the appropriate server 50. If not, a new server 50 is constructed at 106 to accommodate subsequent transactions.

To perform the various functions which are capable of being provided by the financial transaction system 1 of the present invention, the central processing unit 10 makes use of a variety of different servers 50 which interpret and process the information received as previously described. This may include, for example, servers 125, 200 for accommodating credit card transaction authorization requests, servers 220, 200 for handling check guarantee requests, servers 250 for capturing a prescribed sequence of transactions for resolution and settlement, servers 400 for cash management of the transactions captured and servers 450 for handling inventories. Operation of these various servers will be described in further detail below. It will be understood that servers 50 other than the foregoing may also be developed and addressed, as appropriate, in accordance with the financial transaction system 1 of the present invention.

Figure 7A:
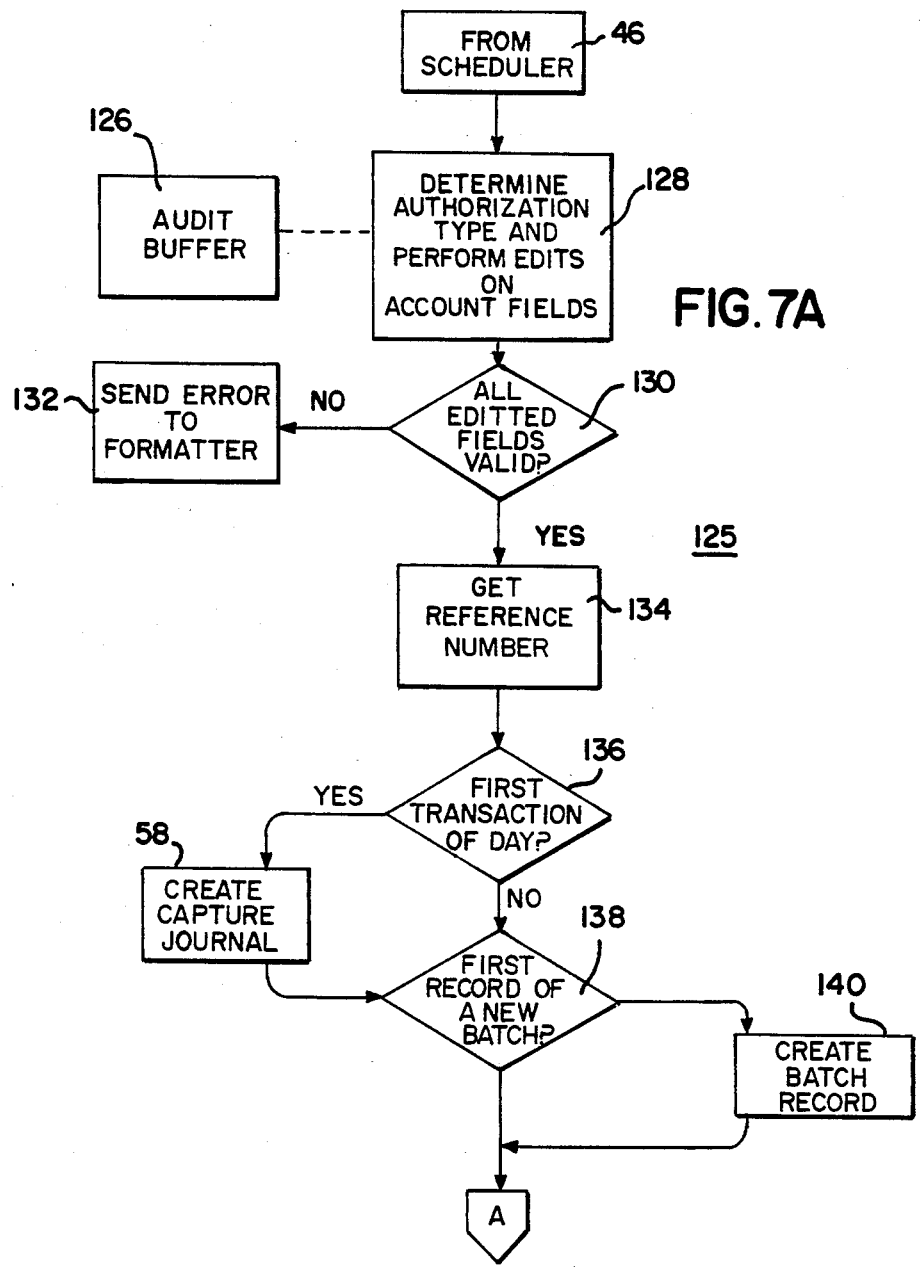

FIGS. 7A and 7B describe a server 125 for processing credit card transaction authorization requests. In its preferred embodiment, data terminal 5 will provide its operator with a series of prompted messages eliciting information needed in processing a transaction by means of its various servers 50, in this case the server 125. For example, a first inquiry will preferably request a transaction code indicative of the type of transaction which is to be performed by the system. In connection with description of the server 125, it shall be assumed that the transaction code entered indicates that a credit card (institutional or private label) authorization is being requested in connection with an entered transaction. In such case, the operator of data terminal 5 will then be prompted to sequentially enter a variety of information fields including, for example, a clerk personal identification number (PIN), the credit card account number, the amount of the sale, and the ticket number of the paper copy of the transaction which will subsequently be supplied to the credit card company involved. It will be understood that such fields are by and large optional, and that if desired, various fields may be eliminated or added to the series elicited, and that the information sought may be requested in any order desired. However, as a further entry, and in accordance with the present invention, it is particularly desirable that the amount of the sale be re-entered at some point during the transaction to provide a double-check of the transaction as will be more fully described below.

Assuming that all of the data fields have been entered, and that the financial transaction system 1 has been appropriately addressed, the operator then awaits receipt of an indication regarding authorization of the transaction, which is provided as follows.

Information received from the data terminal 5 is appropriately processed as previously described, and is delivered from the scheduler 46 to the server 125. With reference to FIG. 7A, the audit buffer 126 of the message received is first edited at 128 to verify that the various fields entered by means of data terminal 5 are operative fields. This may include, for example, a check of the credit card number, the ticket number, etc., to determine if the data received is at least correctly formatted for subsequent recognition. Also at this time, the two amounts entered as previously described are compared to verify that the amount has been entered correctly. Each of the edited fields are then tested at 130. In the event that any of the fields are found to be invalid, or if the entered amounts do not compare, an error message is developed at 132 and forwarded to the formatter 40 for appropriate display of a message indicating the nature of the error detected at the data terminal 5 as previously described. The operator is then free to re-enter the transaction to obtain an appropriate authorization. In the event that all fields are found to be valid, and the entered amounts compare, the message is assigned an identifying reference number at 134 which is unique to the message being processed, and which preferably includes a Julian date prefix followed by a sequential identification number. This numerical system is preferred in that the reference number provided facilitates organization of the transactions entered for a given day as will be more fully described below, as well as assigning the transaction with a unique identity.

Having assigned the transaction with a unique reference number, but prior to obtaining approval of the transaction, two preliminary tests are performed. A first test 136 reviews the reference number to determine whether or not the transaction being processed is the first transaction of a business day. If so, a new journal 58 is created for that day. If not, server 125 merely proceeds to the second test. A second test 138 reviews the reference number to determine whether or not the transaction being processed is the first transaction entered by means of a particular data terminal 5. If so, a batch record 140 is created to record all transactions involving that particular data terminal 5 in the course of a given business day. If not, the server 125 merely proceeds to make a determination as to whether or not the transaction entered is an authorized one.

With reference to FIG. 7B, authorization of a particular transaction will initially depend upon whether the transaction relates to a sale or a return. This threshold determination is made by test 142.

In the event of a return, and if the account number provided is found to be valid, the transaction is automatically approved at 144 since credit verification is not required. In such case, an approval code is generated at 144, whereupon the transaction is entered in capture journal 58 and the audit buffer of the message is modified to call for transmission of the authorization to the appropriate data terminal 5, at 146. The transaction is also entered in the appropriate batch record 140, at 148. The updated message is then delivered to the formatter 40 for appropriate display at the data terminal 5.

In the event of a sale, a credit verification is required. However, in connection with most available credit card transaction services, two lines of communication are generally established between the operator of the data terminal 5 and the credit card data base 54. A first line of communication is established via the data terminal 5 in accordance with the present invention. A second line of communication bypasses the data terminal 5, and is established via direct voice contact (a voice referral) with the credit card data base 54 to provide assistance in those cases where operation of the data terminal 5 is not able or sufficient to perform a particular operation. This may include instances involving an inoperative system, or portion of a system, or special considerations which are not appropriately displayed at the data terminal 5. In view of this, and for purposes of convenience which will be more fully described below, server 125 automatically assumes that all requests for the verification of a credit card sale will require a voice referral, as opposed to being capable of completion by direct communication using the data terminal 5. This assumption is entered in the capture journal 58, at 150. This assumption is also entered in the batch record 140 for the data terminal 5 addressed, as well as the site record contained in the audit buffer of the message, at 152. The updated message is then transferred, at 154, both to the router 52 which establishes communication with the appropriate credit card data base 54, and to the pending function 62.

Figure 8:
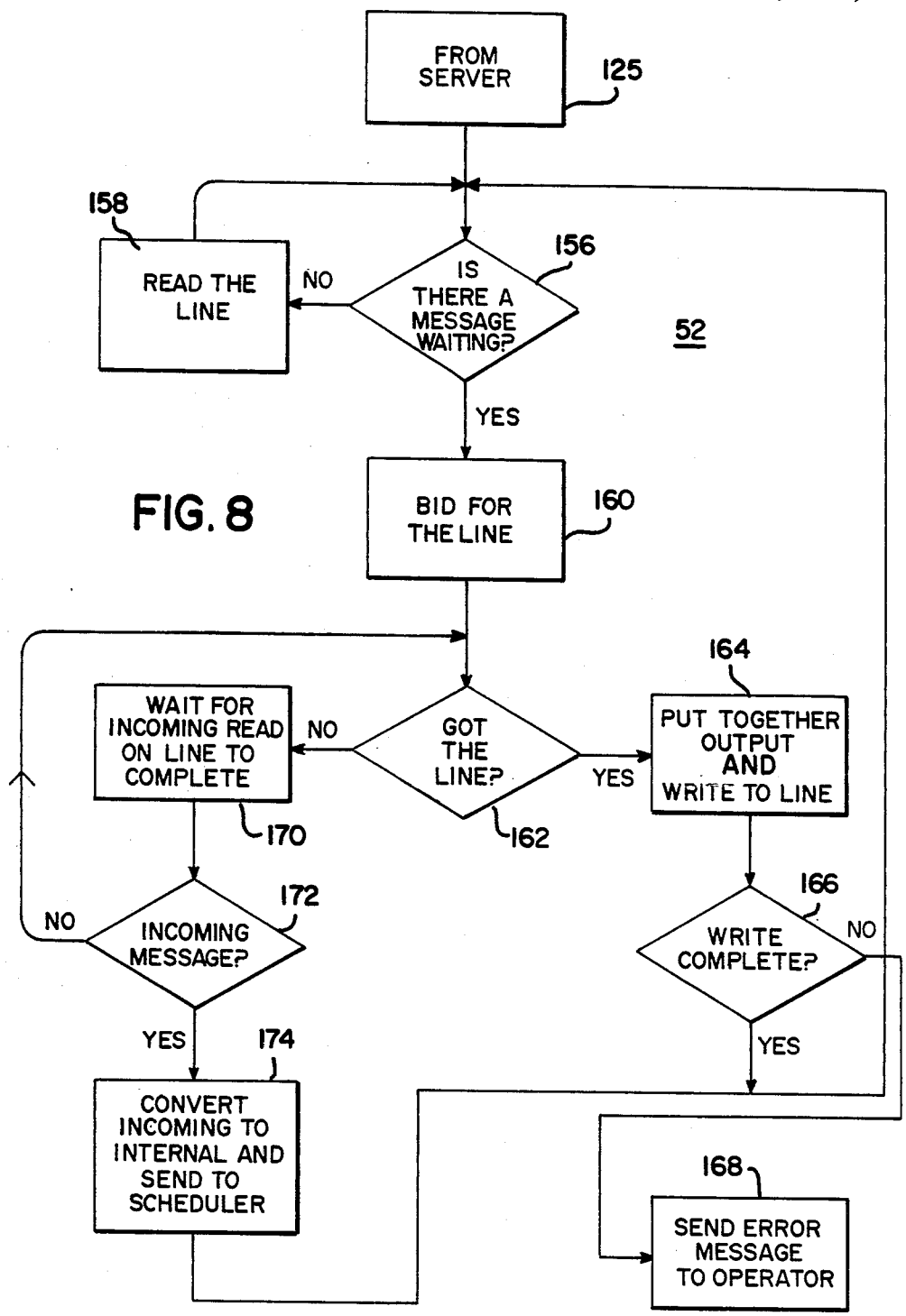
FIG. 8 is a schematic diagram which provides expanded flow charting of a router which is used in communicating with the various data bases addressed by the financial transaction system.

With reference to FIG. 8, the router 52 continuously monitors server 125, at 156, to determine if a message awaits further processing. If not, periodic searches are performed at 158 until such time as a message is detected. Upon detecting a message, a line is sought at 160 which will enable the central processing unit 10 to communicate with the credit card data base 54. To determine if a line has been secured, a test is made at 162.

In the event that a line is secured, the message received from server 125 is converted in format from the internal format which is recognized by the central processing unit 10 to a format which is recognized by the credit card data base 54, and the translated message is then forwarded to the credit card data base 54, at 164. To this end, a different router 52 will be provided for each of the various data bases 54 to be accessed, in the event that such data bases 54 make use of different formats.

A test 166 is performed to verify that the desired transmission has been completed. If so, router 52 repeats operation to receive subsequent messages from the server 125. If not, this indicates that there is some difficulty with the credit card data base 54, or the line being used to transmit information to the credit card data base 54. In such case, the message involved is not transmitted, but rather an error message is developed at 168 and forwarded to the formatter 40 for display at the data terminal 5, to indicate to the operator that the financial transaction system 1 cannot be used to complete the authorization request, and that voice contact with the credit card data base will be required to complete the transaction. It will be noted that since server 125 assumed this to be the case, at 150, such operations can be immediately performed, without further amendment to the message, the capture journal 58 or the batch record 140.

In the event that test 162 determines that the line is not available, indicating that an incoming message is being received back from the credit card data base 54, a delay is introduced at 170 which waits for the incoming message to be completed. A test 172 is then performed to determine whether or not the incoming message has been completed. If not, the foregoing operations are repeated. If so, the incoming message is converted at 174 from the format which is recognized by the data base 54 to the internal format which is recognized by the central processing unit 10, and is transferred to the scheduler 46, at 66, for subsequent processing as will be described below. The router 52 is then recycled to search for additional messages received from server 125.

Figure 9:
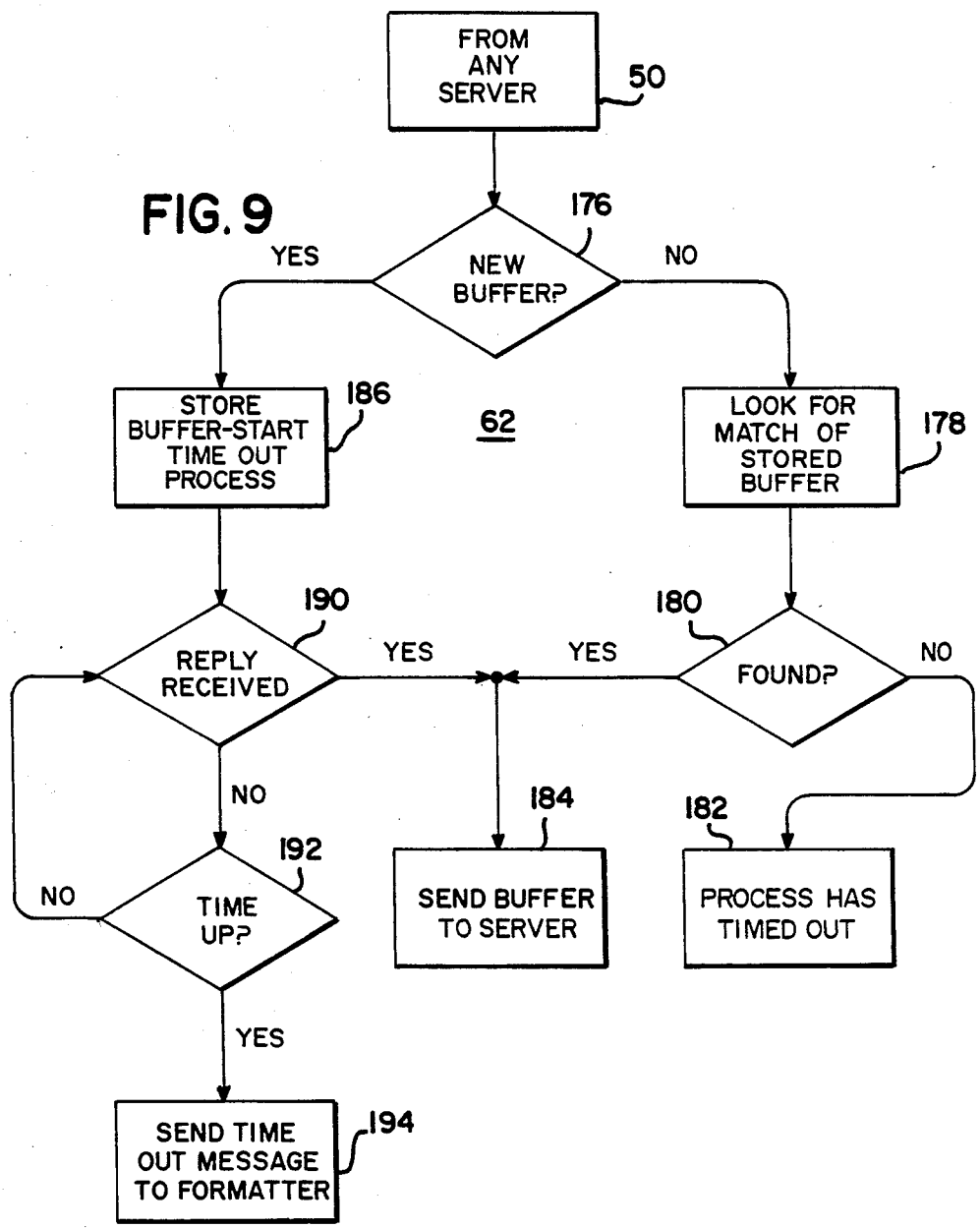
FIG. 9 is a schematic diagram which provides expanded flow charting of means for matching an authorization reply with its associated request, and for providing a timing sequence which is used to monitor operation of the financial transaction system.

With reference to FIG. 9, a timing routine is provided by pending function 62 which limits the amount of time which is allotted to a particular operation so as to detect system malfunctions which have prevented a desired operation from being accomplished within a reasonable amount of time, indicating a fault in the system. Although presently described in connection with a credit card authorization request, it will be understood that the pending function 62 forms an integral part of the central processing unit 10 and is therefore capable of operation in conjunction with any of the various servers which comprise the financial transaction system 1.

To initiate the timing routine, a test 176 is made to determine if the message received is a new message, indicating the need to initiate a timing sequence. If a new message has not been received, a search is made at 178 to determine if a previous message is still being timed. If the previous message is not located, this indicates that the message is no longer being operated upon and that the process involved has exceeded its prescribed time period. In such case, voice contact with the data base 54 will have already been prescribed in order to complete the transaction, and an appropriate error message will have already been forwarded to the formatter 40 for appropriate display at the data terminal 5.

For this reason, the received message is simply terminated, at 182. If the previous message is located, this indicates that the operation has proceeded on schedule, and the message is delivered to the appropriate server, at 184, for subsequent processing.

If a new message has been received, the message is temporarily stored at 186 and a timing procedure is initiated. To this end, a test 190 is periodically performed to determine whether or not a reply has been received in response to the inquiry made in connection with the message stored. If so, this indicates that the reply has been received within the prescribed time interval, and the message is delivered to the appropriate server, at 184, for subsequent processing. If not, a further test 192 is performed to determine whether or not the time allotted for the prescribed function has elapsed. If not, receipt of a reply to the inquiry made is again searched for. If so, an error message is developed at 194 and transferred to formatter 40 for appropriate display at the data terminal 5, providing the operator with an indication that voice contact with the data base 54 will be required to complete the transaction.

In connection with either of the error messages 182, 194 developed by operation of the pending function 62, it will be noted that the operator has been constrained to a voice referral in order to complete the desired transaction. As previously described, server 125 makes an assumption, at 150, that such a voice referral will be required. As a result, central processing unit 10 is capable of immediately transmitting a message to data terminal 5 which indicates the need for voice communication, without requiring the amendment of any system parameters, facilitating such operations.

Figure 10:
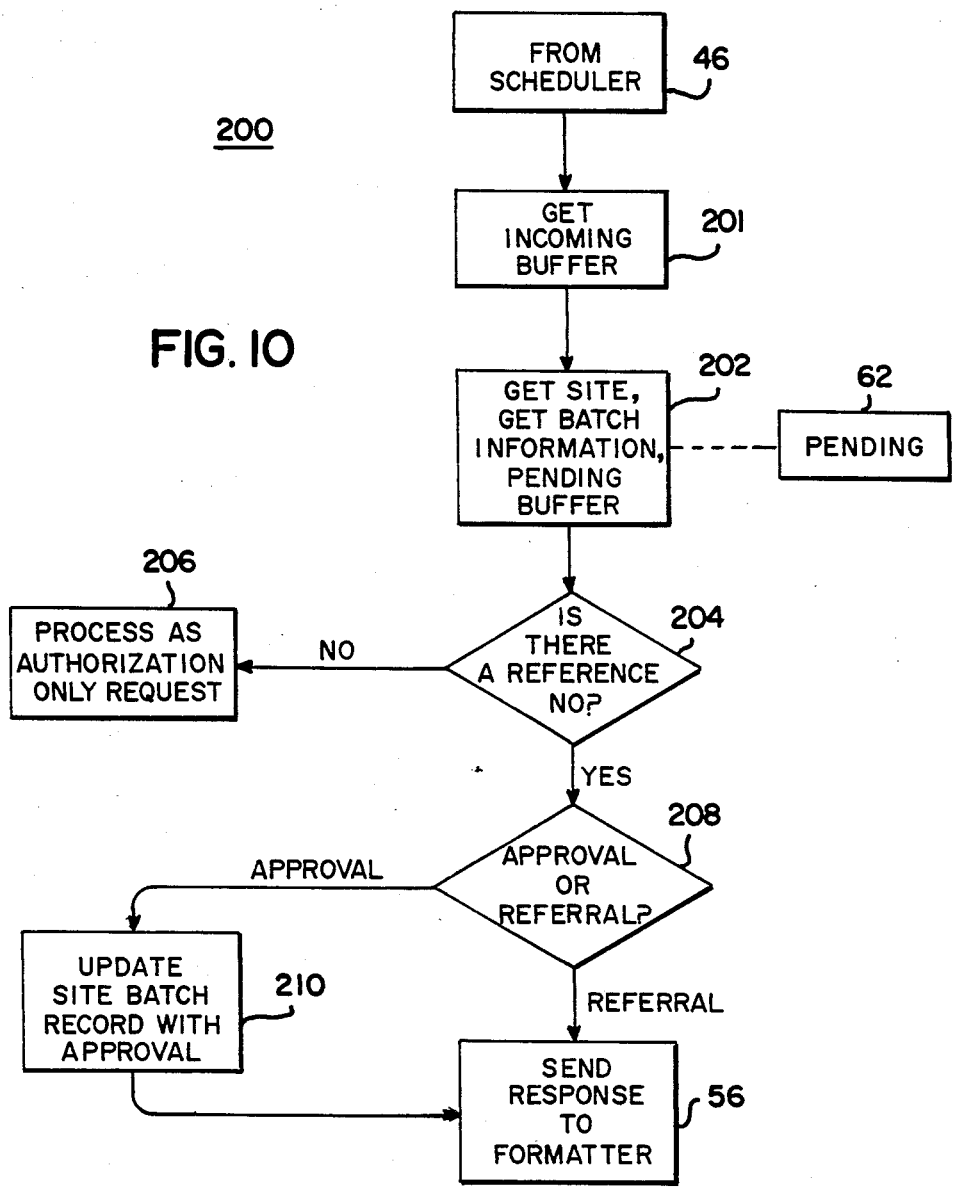
FIG. 10 is a schematic diagram which provides expanded flow charting of a second server selectable by means of the scheduler of FIG. 2 and which is used to process an authorization reply and to update the financial transaction system in accordance with the results of the reply.

It shall now be assumed that an authorization request processed by server 125 has been forwarded to the appropriate credit card data base 54 by means of router 52, that router 52 has received a responsive message from the credit card data base 54, and that the responsive message has been appropriately delivered to the scheduler 46 as previously described for subsequent processing, all within the time constraints established by the pending function 62. In such case, scheduler 46 calls up the authorization server 200 which is illustrated in FIG. 10 to complete the authorization transaction. The returned message is received at 201, and related information pertaining to the message (site, batch, original message, etc.) is secured at 202, subject to timing constraints prescribed by pending function 62. The secured data is then tested at 204 to determine whether or not the original message contains a reference number (as assigned at 134). If not, it is assumed that the only information being sought is whether or not a particular transaction has been authorized, and an authorization verification (or denial) is provided at 206, for display at the data terminal 5.

If a reference number is detected, a test 208 is then performed to determine whether the transaction has been approved (or denied), or whether a voice referral was indicated. If a voice referral is involved, the message is immediately delivered to the formatter 40, to arrange for display at the data terminal 5 of the reference number assigned to the transaction by the server 125, at 134, and a code indicating the disposition (voice referral) of the transaction. Again, it will be noted that as a result of the assumption that a voice referral would be required, made by the server 125 at 150, this transfer is accomplished without further amendment to the message.

If the transaction has been approved (or denied), the batch record 140 is updated at 210 to replace the assumption that voice contact would be required with an indication that the transaction has been approved (or denied). It is to be noted that this is the only detected condition which requires amendment of the batch record to replace the assumption of voice contact. For an approval, the updated message (reference number and disposition code) is then sent to the formatter 40 for return to the data terminal 5, to indicate approval of the transaction. The operator of the data terminal 5 is then able to copy the assigned reference number and disposition code on to the ticket which is used to provide written documentation of the transaction, for future reference. Similarily handled are voice referral transactions. For a declined transaction, rather than copying a reference number and disposition code, the operator would merely indicate on the ticket that the transaction has been declined. In either event, the remainder of the transaction involved (e.g., completing the sale, obtaining the customer's signature on the ticket, etc.) would proceed in conventional fashion based upon the information provided.

The foregoing assumes that the transaction for which authorization has been requested involves a sale by means of an offered credit card, either institutional or private label. In the event that the transaction involved is a return on a sale by means of a credit card, similar fields would be introduced to the data terminal 5 by an operator to secure authorization for the return in the manner previously described. Authorized/declined returns would be appropriately indicated at the data terminal 5, providing the operator with a reference number for authorized returns and voice referrals. Irrespective of outcome, the disposition reported (reference number and disposition code or declined) would be entered on an appropriate return ticket for submission to the credit card agency involved, and the remainder of the transaction would be completed as appropriate.

Figure 11:
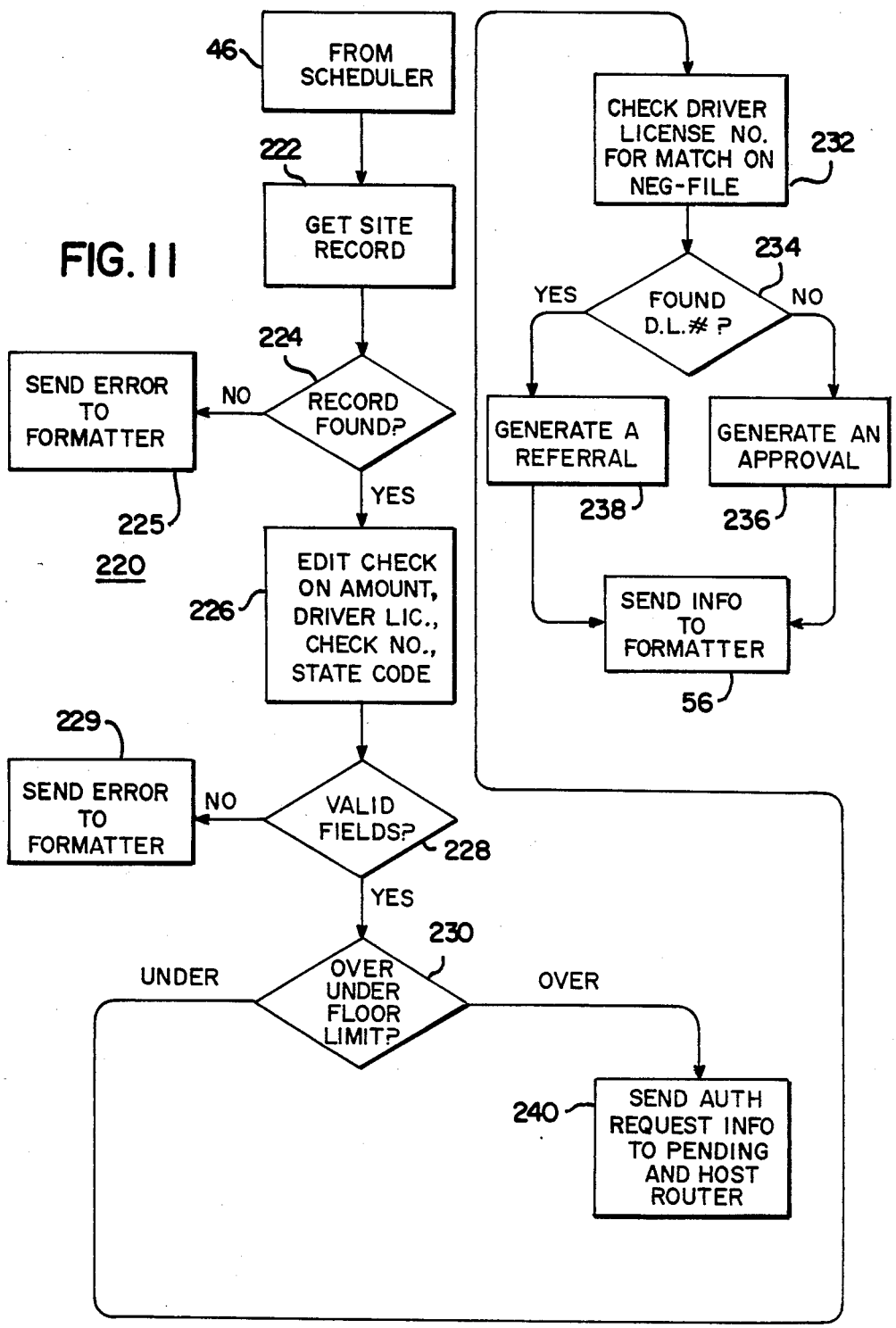
FIG. 11 is a schematic diagram which provides expanded flow charting of a third server selectable by means of the scheduler of FIG. 2 and which is used in obtaining authorization to accept a presented check.

FIG. 11 illustrates a server 220 which operates in parallel with the credit card authorization server 125 to enable authorization requests to be made in relation to the acceptance of personal checks or the like. The fields of information entered by means of the data terminal 5 to initiate a check authorization request are essentially similar to those fields entered in connection with a credit card transaction authorization request. However, in connection with a check authorization request it will be understood that a checking account number would be entered instead of the credit card account number and that, if desired, further information may also be requested to satisfy the particular needs of a check authorization request. This may include, for example, a driver's license number, the state of the driver's license presented, or such other personal identification as may be required by the retail establishment or the check authorization service. As with credit card transactions, it is preferred that the amount of the transaction be entered twice, for verification purposes. Initial preparation of the data received from the data terminal 5 would proceed as described previously. In connection with such processing, scheduler 46 would select server 220 to initiate a check authorization routine (based upon information placed in the audit buffer of the message received).

In operation, server 220 initially obtains the site record for the data terminal 5 being accessed, at 222. A test 224 is then performed to determine whether or not check authorization services are subscribed to in connection with the data terminal 5 addressing the system. If not, an appropriate error message 225 is developed and delivered to formatter 40 for display at the data terminal 5. If check verification is subscribed to, the received message is then edited at 226, to verify that the several fields entered at the data terminal 5 (including driver's license number, state, etc.) are operational, and to compare the amounts entered in connection with the transaction. Suitable tests are then performed at 228. If any fields are determined to be invalid, or if the amounts do not compare, an appropriate error message 229 is developed for delivery to formatter 40 and display at the data terminal 5, to provide the operator with an indication of the error encountered so that the operator may correct the error and again request an authorization. If all fields are determined to be valid, and if the amounts compare, server 220 proceeds with the authorization request.

To this end, a threshold determination is made as to whether or not the amount of the transaction entered exceeds a prescribed floor (minimum) limit, at 230. If the amount of the transaction is less than the floor limit, approval of the transaction is accomplished by the server 220, without accessing the check authorization data base 54. In such case, the driver's license number is checked, at 232, against a file of license numbers representing accounts wherein check authorizations are not to be automatically issued (e.g., bad risks, recalcitrant customers, etc.). A test 234 is then performed to determine whether or not the license number entered is on the list. If not, an approval is generated at 236. If so, a voice referral is generated at 238. In either case, the disposition of the transaction is forwarded to formatter 40 for appropriate display at the data terminal 5.

If the amount of the transaction exceeds the floor limit, the check authorization data base 54 must be accessed to obtain approval for the check. Such access is initiated at 240, and operates in combination with a host line handler similar to the router 52 illustrated in FIG. 8, and a timing routine similar to the pending function 62 illustrated in FIG. 9. Messages returned from the check authorization data base 54 are then capable of being received and processed by an authorization server similar to the authorization server 200 illustrated in FIG. 10, appropriate information (a reference number, a "declined" message, a voice referral, etc.) being supplied to the operator at the data terminal 5 to enable the transaction to be completed.

Thus, the foregoing provides a means for authorizing various credit-type transactions, including credit card and check transactions, while simultaneously journaling those transactions entered into in the course of a given business day. In accordance with the present invention, such data is further processed and used to resolve the day's receipts and secure payment for the series of credit transactions performed, as follows.

In connection with the following discussion, it shall be assumed that a selected business day (or period) has been completed and that it is desired to resolve the day's receipts and obtain payment for the transactions performed. At this point in time, the various journals developed will contain a record of all credit card and check transactions (sales and returns) entered into during the business day. Authorized and declined transactions will be complete and ready for resolution. However, a number of transactions may remain incomplete, and will therefore require further processing in order to be resolved. This will of course include all transactions which required voice communication in order to be completed. Other missing data may also be involved, as may incorrect entries. In accordance with the present invention, there is provided a capture server 250 which operates to complete those transactions which are not yet fully entered, to correct erroneous entries, to balance the completed and corrected transactions to resolve the receipts for the business day, and to submit the day's receipts for payment.

Server 250 receives its input from scheduler 46, being accessed by means of a data terminal 5 as previously described in connection with other functions of the financial transaction system 1. However, in the case of a capture operation, different data fields are preferably elicited at the data terminal 5. As previously, the first field requested is preferably a transaction code which calls up the capture operation, and initiates a series of prompts requesting the information which will be used in completing the capture of transactions including, for example, a password which is assigned to the operator of the data terminal 5 as a security measure, the identity of the terminal or terminals which are to be operated upon, etc. Of course, a variety of data fields may be elicited in connection with a capture operation apart from the fields described above, however, it is particularly desirable that a password be used to avoid unauthorized access to the various functions of the server 250, to avoid tampering with the payment functions to be described below.

Upon the entry of data, the site file 38 is accessed, at 252, to obtain the password and other necessary data pertaining to the data terminal 5 being accessed. Appropriate field edits are then initiated, as desired, and a test 254 is performed to verify that the password which has been entered is a valid password for the terminal accessed, and to verify that all fields have been properly entered. If not, an appropriate error message is developed at 255 and delivered to the formatter 40 for display at the data terminal 5. If all is in good order, a threshold determination is made at 256 as to the nature of the operation which is to be performed in completing the capture of transactions, whereupon the data being operated upon is routed to the appropriate operating routine 260, 280, 290, 310, 320, 340, 360, 380 illustrated in greater detail in FIGS. 12A-12H.

Figure 12A:
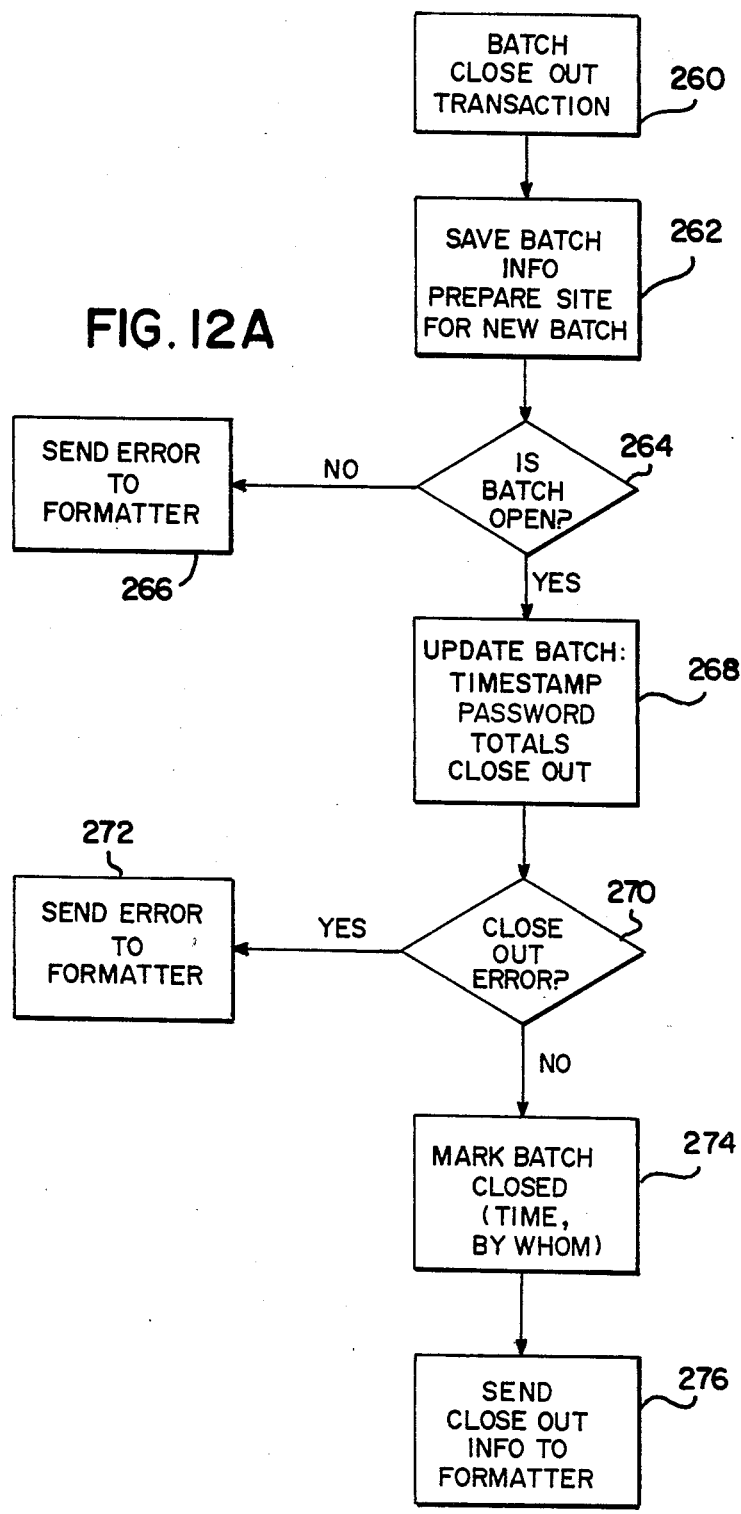
FIG. 12A is a schematic diagram which provides expanded flow charting of the batch close-out function of FIG. 12.

FIG. 12A illustrates a batch close out routine 260 which essentially operates to isolate the transactions entered in a particular data terminal 5 for a given business day (a batch). To this end, and upon initiating a batch close out, steps are first taken at 262 to secure the pertinent batch information which is stored in batch record 140 and to prepare the batch record 140 to receive a new batch for the next business day. Upon preserving the batch, a test 264 is performed to determine whether or not the preserved batch currently remains open. If not, an error message 266 is delivered to the formatter 40 for display to the operator of the data terminal 5, providing an indication that the batch has already been closed out and that a further batch close out is not required. If the batch remains open, the batch is fixed with a time stamp and the password for the terminal accessed, and totals are run for the batch, at 268.

A test 270 is then performed to determine if any errors have been made by the system in preserving the batch as previously described. If so, an error message 272 is delivered to the formatter 40 for appropriate display at the data terminal 5 to indicate to the operator that an error has been detected which prevents batch close out. If no such errors are detected, the batch is marked closed at 274 and the operator is advised of a successful batch close out at 276. The nature of the close out message sent to the operator by means of data terminal 5 preferably takes the form of an identifying number for the particular batch which has been closed out, which number may be used by the operator, in conjunction with the password, to access the batch for various purposes which will become apparent below.

Figure 12B:
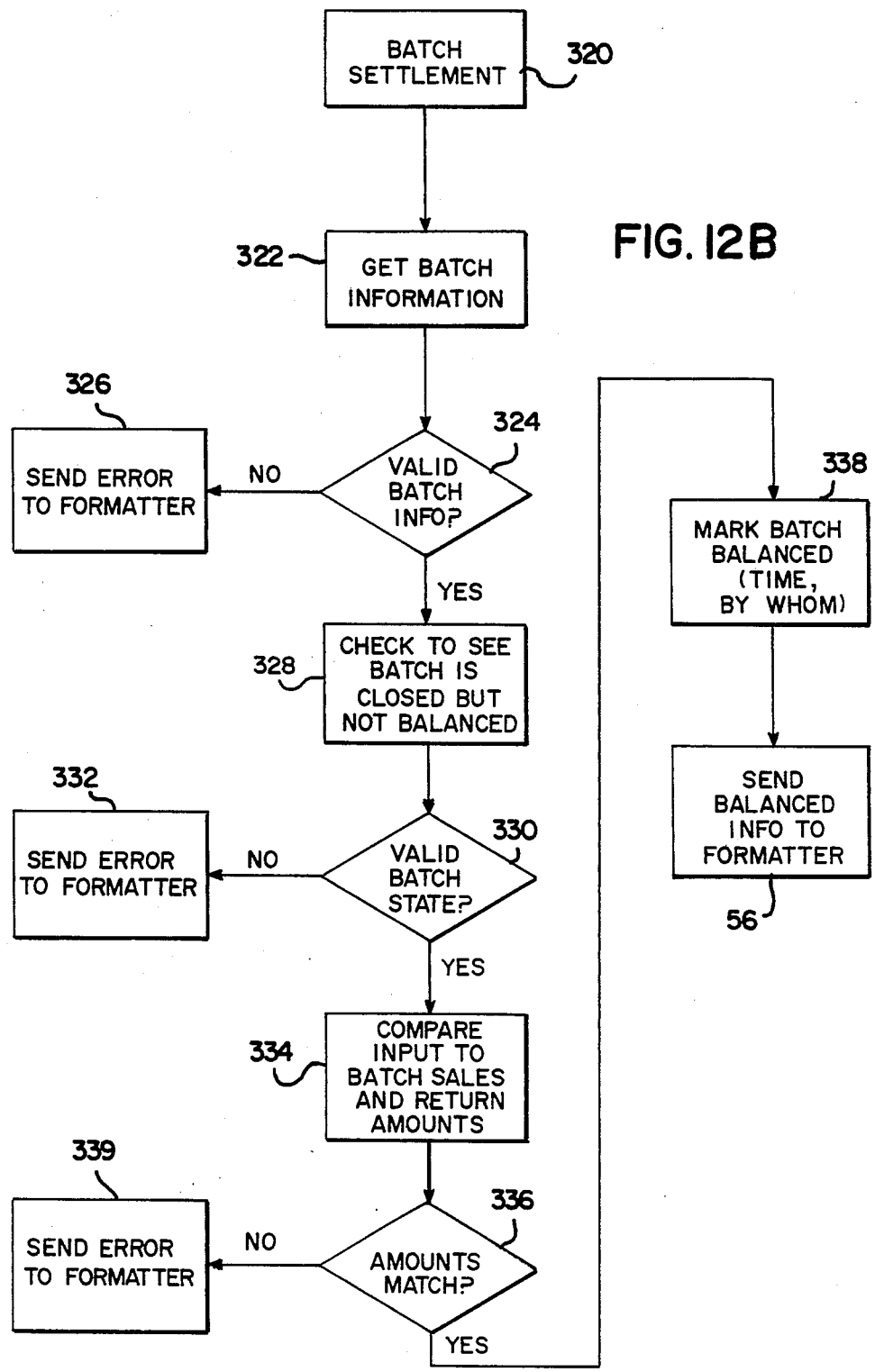
FIG. 12B is a schematic diagram which provides expanded flow charting of the batch settlement function of FIG. 12.

The foregoing serves to close out a particular batch to prevent further entries from being made to the collection of transactions assembled. However, it remains to balance or settle the isolated batch in order to secure payment for the day's transactions. This is accomplished by means of a batch settlement routine 320, as illustrated in FIG. 12B. In accessing the batch settlement routine 320, the operator first enters the appropriate transaction code, whereupon suitable information is requested in response to appropriate prompts provided at the data terminal 5 incuding, for example, the password of the operator, the identity of the data terminal 5 being accessed, the batch number of the transactions being settled, and the number and total amount of the sales and returns for the batch as independently tallied by the operator.

Upon initiating a batch settlement, the batch is obtained at 322, and a test 324 is performed to verify that the batch sought has been located and is therefore validly requested. If not, an error message 326 is delivered to the formatter 40 for appropriate display at the data terminal 5. If the batch request is found to be valid, a check is made at 328 (in conjunction with test 330) to verify that the batch has been closed, but has not yet been marked balanced. If not, this indicates that the batch has already been closed and balanced, and that a batch settlement procedure is therefore not required. In such case, an error message 332 is delivered to formatter 40 for appropriate display at the data terminal 5, to indicate to the operator that the batch has already been closed out and balanced.

If it remains to settle the batch, a comparison is then made at 334 between the tallied sales and returns introduced by the operator and the internal tallies computed for the batch. A test 336 is performed to determine whether or not the amounts match. If so, the batch is marked balanced, and stamped with the time and the password of the operator, at 338. The balanced amounts are then delivered to formatter 40 for appropriate display at the data terminal 5, to indicate to the operator that the batch has been balanced for payment. In the event that test 336 reveals that the amounts tallied by the operator do not coincide with the amounts tallied for the batch, an error message 339 is delivered to the formatter 40 for appropriate display at the data terminal 5. Error message 339 preferably indicates which amounts are out of balance so that appropriate steps may be taken to balance the batch and achieve batch settlement.

More likely than not, steps will remain to be taken to provide the captured batch with all of the information which is required for actual settlement and payment. For example, errors may have been made in entering one or more transactions during the course of the business day, or one or more transactions may be incomplete as a result of voice referrals made during the course of the business day, or an inoperative system component which prevented the entry of data into the financial transaction system 1. To locate such errors and omissions, inquiry routines 280, 290, 310 are provided to assist the operator of the data terminal 5 in accessing the batch which has been captured.

Figure 12C:
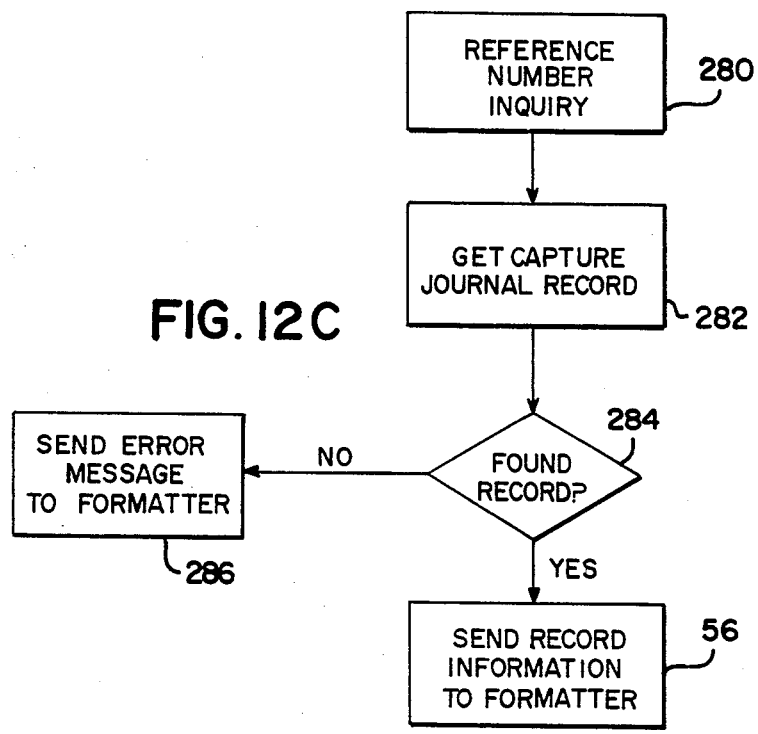
FIG. 12C is a schematic diagram which provides expanded flow charting of the reference number inquiry function of FIG. 12.

FIG. 12C illustrates a reference number inquiry routine 280 which enables the operator to access a particular transaction making use of the identifying reference number which was assigned (at 134) to the transaction upon its approval. In accessing the reference number inquiry routine 280, the operator would first enter the appropriate transaction code, whereupon suitable information such as the password, terminal identification and reference number to be accessed would be entered into the system responsive to appropriate prompts provided at the data terminal 5. Upon initiating a reference number inquiry, capture journal 58 is accessed at 282. It is to be noted that it is the capture journal 58 which is being accessed and not the batch journal 140. This is because the reference number is a unique number identifying the particular transaction involved, enabling direct access of the capture journal to obtain the information desired. A test 284 is performed to determine whether or not the record sought has been found. If not, an error message 286 is delivered to the formatter 40 for appropriate display at the data terminal 5. If located, the requested information is transferred to the formatter 40 for display to the operator at the data terminal 5. Such displayed information may include, for example, items such as the reference number operated upon, the related ticket number, the amount of the transaction, etc.

Figure 12E:
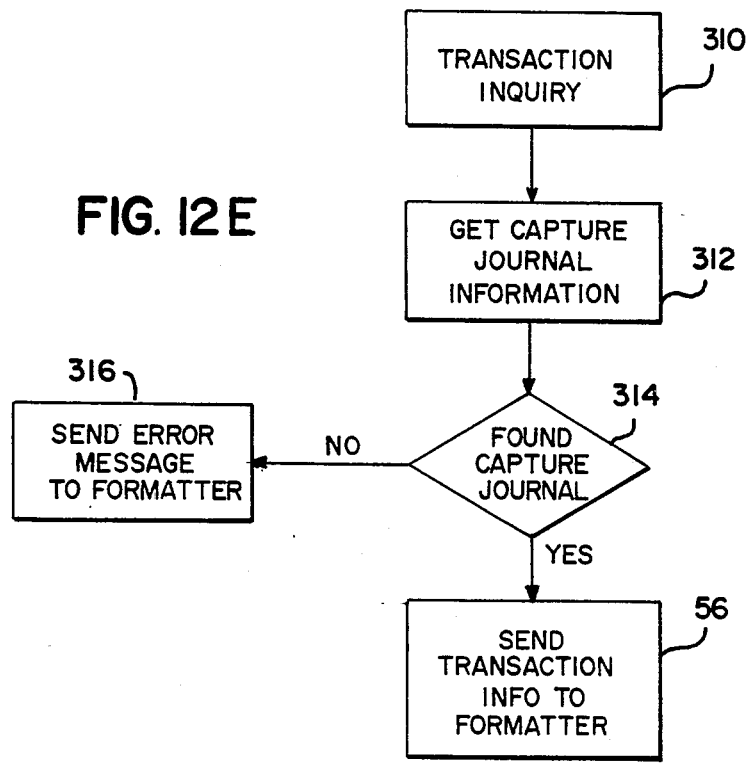
FIG. 12E is a schematic diagram which provides expanded flow charting of the transaction inquiry function of FIG. 12.
Figure 12D:
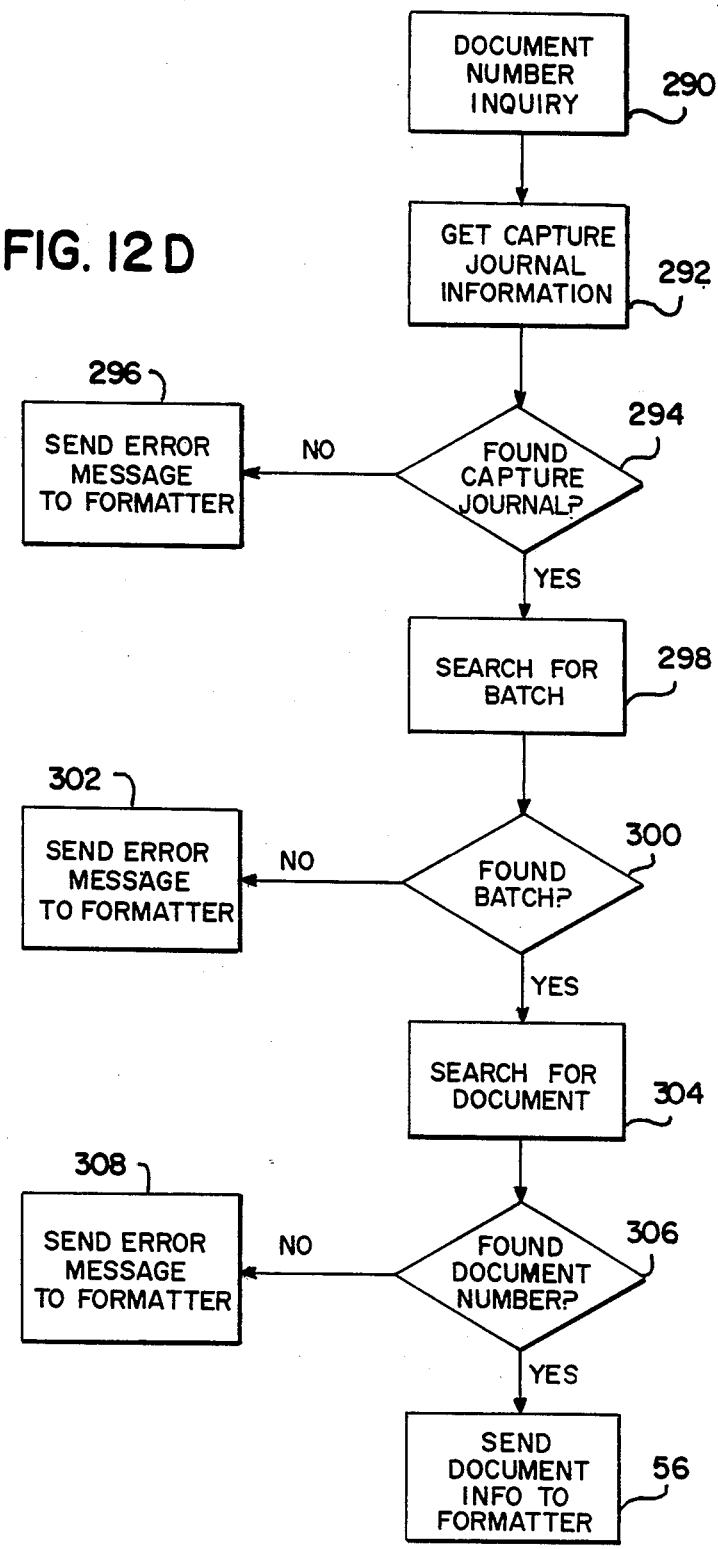
FIG. 12D is a schematic diagram which provides expanded flow charting of the document number inquiry function of FIG. 12.

FIG. 12D illustrates a document number inquiry routine 290 which enables the operator to access a particular transaction making use of the document number printed on the ticket which memorializes the transaction involved. In accessing the document number inquiry routine 290, the operator would first enter the appropriate transaction code, whereupon suitable information such as the password, the terminal identification number, the batch number, and the document number to be accessed would be entered into the system responsive to appropriate prompts provided at the data terminal 5. Upon initiating a document number inquiry, capture journal 58 is accessed at 292, and a test 294 is performed to determine whether or not the information sought has been found. If not, an error message 296 is delivered to the formatter 40 for appropriate display at the data terminal 5. If the capture journal is located, the particular batch involved is then sought at 298. This additional search is performed because document numbers are not necessarily unique and therefore may be found in more than one batch contained in the capture journal. It is therefore necessary to further narrow the field of search to enable the particular item requested to be recalled. A test 300 is then performed to determine whether or not the particular batch sought has been found. If not, an error message 302 is delivered to the formatter 40 for appropriate display at the data terminal 5. If the batch is found, a search for the desired document number proceeds at 304 and a test 306 is performed to determine whether or not the particular document sought has been located. If not, an error message 308 is delivered to the formatter 40 for appropriate display at the data terminal 5. If located, the requested information is transferred to the formatter 40 for appropriate display at the data terminal 5. Such displayed information may include, for example, the document number, the transaction reference number, the amount of the transaction, etc.

FIG. 12E illustrates a transaction inquiry routine 310 which enables an operator to access a particular transaction, making use of the transaction's assigned reference number, to access all information pertaining to the transaction entered. In accessing the transaction inquiry routine 310, the operator would first enter the appropriate transaction code, whereupon suitable information such as the password, terminal identification number and the reference number to be accessed would be entered into the system responsive to appropriate prompts provided at the data terminal 5. Upon initiating a transaction inquiry, capture journal 58 is accessed at 312, and a test 314 is performed to determine whether or not the record sought has been located. If not, an error message 316 is delivered to formatter 40 for appropriate display at the data terminal 5. If found, the requested information is transferred to the formatter 40 for appropriate display at the data terminal 5. Such displayed information may include, for example, the clerk personal identification number, the document number, the card holder account number, the amount of the transaction, the ultimate disposition of the transaction, etc.

In the event that inquiry routines 280, 290, 310 reveal an error or omission in a particular transaction entry, correction of the entry will be required before the operator of the data terminal 5 can proceed to settlement as previously described. Such adjustments are made by means of data modification routines 340, 360, 380 as follows.

Figure 12F:
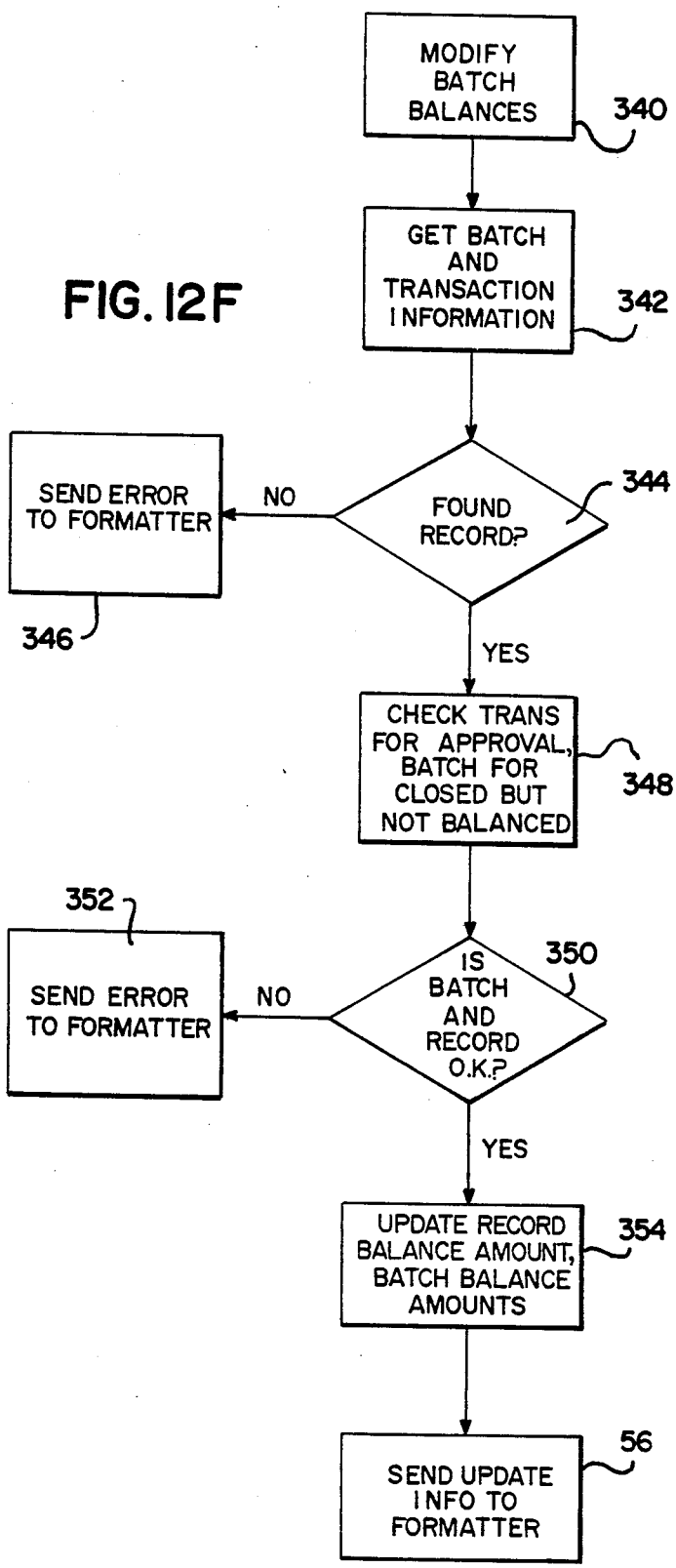
FIG. 12F is a schematic diagram which provides expanded flow charting of the modify batch balances function of FIG. 12.
Figure 12G:
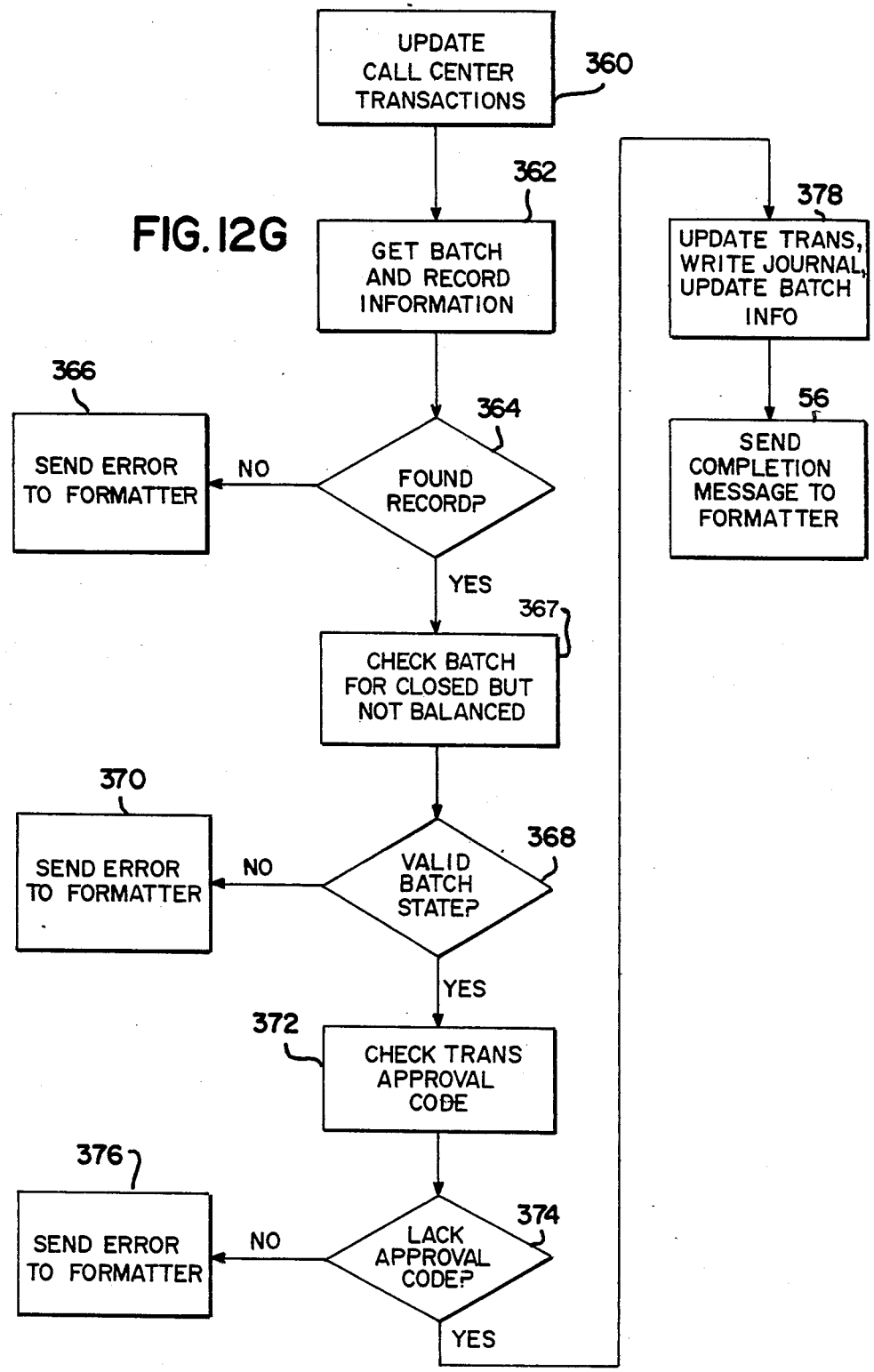
FIG. 12G is a schematic diagram which provides expanded flow charting of the update call center transactions function of FIG. 12.
Figure 12H:
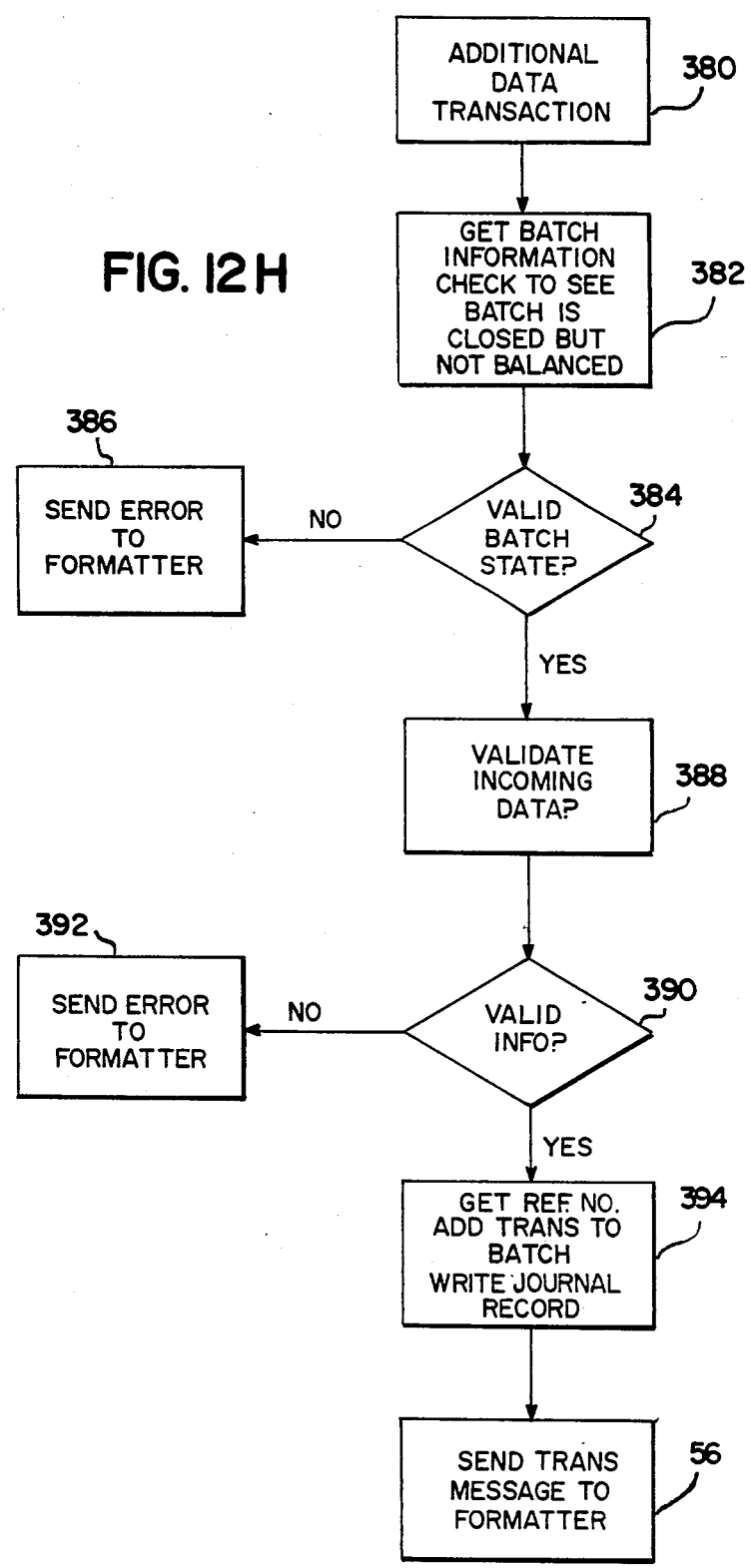
FIG. 12H is a schematic diagram which provides expanded flow charting of the additional data entry function of FIG. 12.

FIG. 12F illustrates a routine 340 for modifying batch balances which have been found to be incorrect. To access the routine 340, the operator first enters the appropriate transaction code, whereupon suitable information such as the password, the terminal identification number, the batch number, the reference number for the erroneous transaction which has been located, and the correct amount for that transaction, is entered into the system responsive to appropriate prompts provided at the data terminal 5. In response, batch record 140 and the related transactional information contained in the capture journal 58 are accessed at 342, and a test 344 is performed to determine whether or not the information requested has been located. If not, an error message 346 is forwarded to formatter 40 for appropriate display at the data terminal 5. If the transaction is located, a check is made at 348 (in conjunction with test 350) to determine if the transaction involved was approved by the appropriate credit card/check authorizing agency, and if the batch has been closed but remains unbalanced.

If it is determined that the transaction was never approved, or that the batch has been closed and is balanced, an appropriate error message 352 is delivered to the formatter 40 for display at the data terminal 5. If the transaction was never approved, correction of the transaction must be accomplished by completing the transaction entered, rather than by modifying the batch balance. If the batch has been closed and is balanced, there is no need to make a correction. If it is determined that the transaction was approved and that batch settlement remains to be accomplished, the accessed transaction is updated at 354. Also updated at 354 are the batch tallies, to enable a subsequent batch settlement to be successfully completed as previously described. The updated data is then forwarded to formatter 40 for return to the data terminal 5, to provide an indication of the correction made.

As previously indicated, it is often necessary to complete various transactions before ultimate settlement is possible. For example, it may be necessary to update transactions involving voice communications prompted by transaction authorization servers 125, 200 as previously described. To this end, and with reference to FIG. 12G, an update call-center transactions routine 360 is provided. To access the routine 360, the operator first enters the appropriate transaction code, whereupon suitable information such as the password, the terminal identification number, the batch number, the reference number, the amount of the transaction, and the authorization code, is entered into the system responsive to appropriate prompts provided at the data terminal 5. In response, the batch record 140 and the related transactional information contained in the capture journal 58 are accessed at 362 to locate the transaction involved, and a test 364 is performed to determine whether or not the transaction sought has been located. If not, an error message 366 is delivered to the formatter 40 for appropriate display at the data terminal 5. If the record is found, a check is made at 366 to determine if the batch has been closed out but is not yet balanced, and a test 368 is performed in relation to this check. If the batch has been closed and is balanced, an error message 370 is delivered to formatter 40 for appropriate display at the data terminal 5.

If it is found that the batch has been closed, but remains unbalanced, a check is made at 372 to determine if a transaction approval code has already been entered in connection with the transaction referenced, and a corresponding test 374 is performed. If a transaction approval code is found, an error message 376 is delivered to formatter 40 for appropriate display at the data terminal 5, since an update is not required for that transaction. If an approval code is lacking, the transaction and the batch tallies are updated at 378, and a message is forwarded to formatter 40 for appropriate display at the data terminal 5, to provide an indication that the call-center transaction has been updated.

It may also be necessary to complete transactions which were accomplished without making use of the financial transaction system 1, such as when the data terminal 5, the central processing unit 10, the data bases 54, or the various interconnecting communication lines are inoperative, or in the event that the system operator approves a transaction in good faith. To enable such information to be entered, and with reference to FIG. 12H, an additional data entry routine 380 is provided. To access the routine 380, the operator first enters the appropriate transaction code, whereupon suitable information is entered responsive to appropriate prompts, such as the password, the terminal identification number, the batch number, the clerk personal identification number, the account number on the credit card (or check number), the expiration date (if appropriate), the amount of the sale, the ticket number, a second entry of the amount of the sale (for verification as previously described), and the authorization code for an approved sale (or an indication of disapproval for a declined sale).

In response, the batch record 140 and the related transactional information contained in the capture journal 58 are accessed at 382, and a check is made to determine if the batch has been closed but is not yet balanced. A corresponding test is then performed at 384. If the batch has been closed and balanced, an error message 386 is delivered to formatter 40 for appropriate display at the data terminal 5. If the batch has been closed but is not yet balanced, the incoming data is validated at 388 by checking the fields of the various parameters entered, and by double-checking the amounts entered against one another, as previously described. A test 390 is then performed to verify that the information entered is valid, and that the amounts compare. If not, an appropriate error message 392 is delivered to formatter 40 for display at the data terminal 5. If the information is determined to be valid, the transaction is treated as if it were an approved credit transaction, at 394, assigning the transaction a reference number, writing an appropriate journal entry, and entering the transaction into the batch for subsequent settlement. A message (reference number and authorization code or a disapproval) is then forwarded to formatter 40 for appropriate display at the data terminal 5, to provide an indication that the additional data has been entered.

Making use of the inquiry routines 280, 290, 310 and the modification routines 340, 360, 380, it should then be possible to correct errors and omissions in the batch isolated by batch close out routine 260 and return to the batch settlement routine 320 to complete a batch settlement and resolve the day's transactions.

Once settled, appropriate payment for the day's transactions can then be obtained from the appropriate agencies. Such payment is facilitated by the financial transaction system 1 of the present invention, enabling a significant reduction in the amount of time required to obtain payment for the day's transactions as follows.

Since the financial transaction system 1 already contains a complete, resolved record of the day's transactions, such data is capable of direct transfer from the financial transaction system 1 to a window bank, e.g., the automated clearing house 30, which is ideally capable of directly receiving such information in its own data processing unit. Such data is then made part of the records which the window bank is in the process of preparing for its other customers, for conventional transmission to each of the several credit/debit card agencies or check verification agencies with which it cooperates. Each of the several credit/debit card agencies or check cashing agencies involved then process the data received in conventional fashion, making the appropriate funds available to the window bank in the usual manner. Such funds can then be credited to the merchant's account either directly, if with the window bank, or by electronic fund transfer to another bank.

It will be noted that in performing the foregoing operations, data processed and organized by the financial transaction system 1 is capable of direct transfer to the window bank, and in turn to the various credit/debit card agencies and check verification agencies to be accessed, for processing without the need for data entry by manual means. This enables a significant reduction in the amount of time required to process a day's transactions for ultimate payment. Still further reduction in processing time is achievable by transferring data directly from the financial transaction system 1 to the credit/debit card agency or check verification agency subscribed to, without intermediate processing by the window bank, as this capability becomes available to the industry. Also to be considered is that since the data being transferred has previously been tabulated and verified by the financial transaction system 1 as previously described, the potential for error in processing such data is substantially reduced.

The above operations are exemplary of current methods which are used by the various credit agencies to process credit transactions for payment, methods which are capable of proceeding to completion in automated fashion based directly upon the data which is developed by the financial transaction system 1 of the present invention. Although a separate, written record of the series of transactions reported is not required for proper operation of the financial transaction system 1, certain written records can be made available, if desired, to memorialize the series of transactions produced for subsequent reference, and to satisfy certain ancillary needs. For example, the retailer may wish to receive an indication as to the status of the various procedures described above, so that the retailer will know what steps have been taken in processing the receipts, and what funds are available for withdrawal or other use. This may be accomplished by providing the retailer with a written report, or by posting such data in the retailer's own data base 20. Also to be considered are the current by-laws of most major credit agencies, which require a record of all such transactions to be retained for a specified period of time. Since, in accordance with the present invention, the retailer is producing tickets or sales slips concurrently with the entry of data into the financial transaction system 1, this requirement is automatically accommodated.

It will therefore be seen that the financial transaction system 1 of the present invention not only serves to obtain approval for various credit card/check transactions entered into during the course of a business day, but also enables the series of transactions entered into to be resolved, settled and paid for in convenient fashion. The financial transaction system 1 of the present invention also optionally incorporates certain ancillary functions for use in connection with the transactions captured, as follows.

Figure 13A:
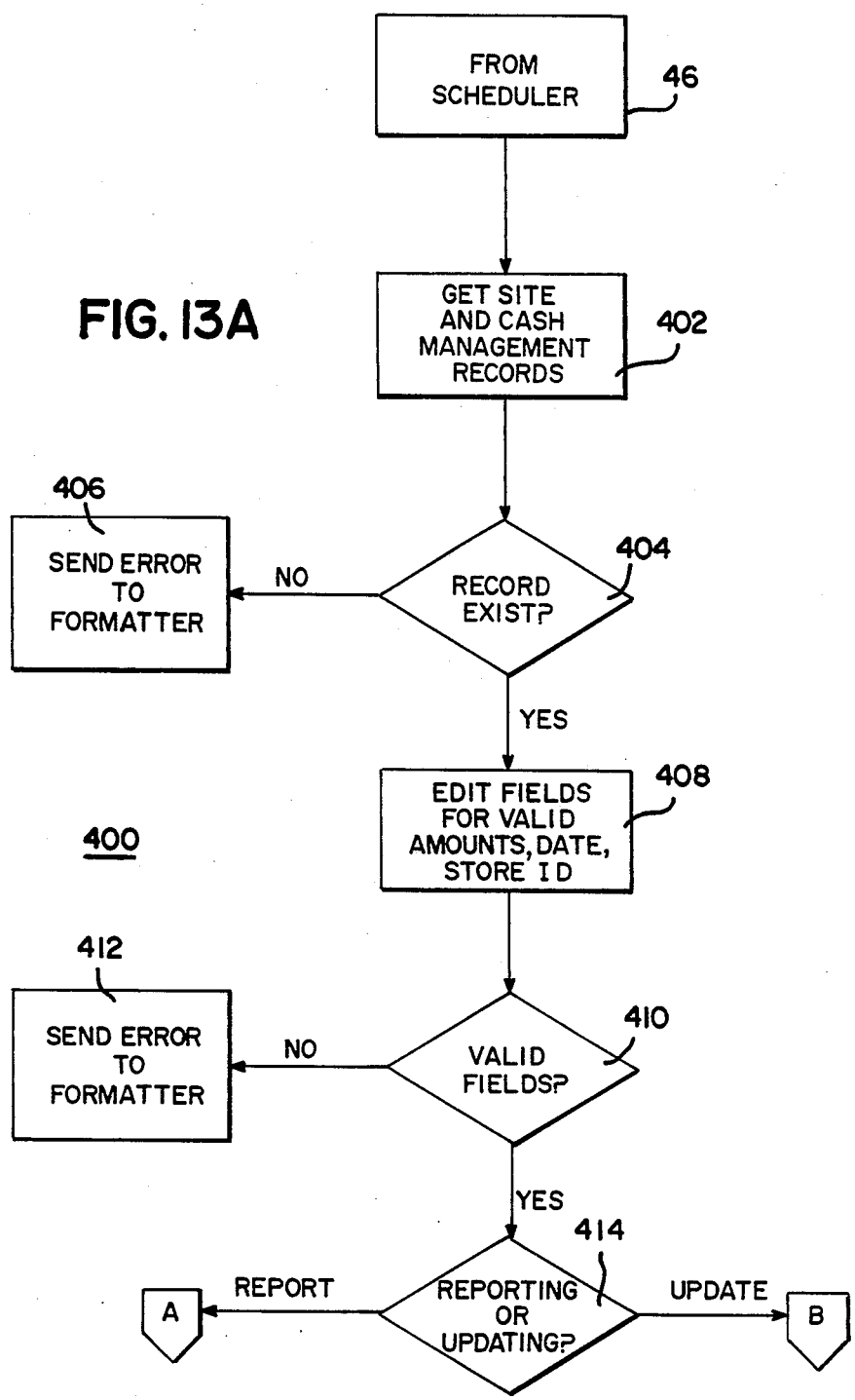

One such ancillary function is cash management, and a cash management server 400 which is capable of providing such a capability is illustrated in FIGS. 13A and 13B. As with all servers, server 400 receives its input from scheduler 46, and is accessed by the entry of an appropriate transaction code. Cash management server 400 is also preferably accessed in combination with an appropriate password, for security reasons. Upon accessing cash management server 400, the site (site file 38) and cash management records (data base 60) are accessed at 402, and a test 404 is made to determine whether or not the records sought have been located. If not, an error message 406 is delivered to formatter 40 for appropriate display at the data terminal 5. If the records are found, the various fields entered in connection with the cash management server 400 are edited at 408, and a test 410 of each field developed is accomplished to verify the validity of the data entered. If a particular field is found to be invalid, an appropriate error message 412 is forwarded to formatter 40 for display at the data terminal 5. If all fields are found to be valid, a threshold inquiry is made at 414 as to whether the information being entered is a report for a given day, or an update of a previously entered report.

In the event that the entry is a new report, the date of the report is determined at 416, and a test 418 is performed to determine whether or not an entry has already been made for the date calculated. If so, an error a message 420 is forwarded to formatter 40 for appropriate display at the data terminal 5. If not, the dated report is entered at 422, and an identifying reference number is generated and delivered to formatter 40 for return to the operator of the data terminal 5, as a means for identifying the newly entered record.

In the event that the entry is an update to be performed, a check is performed at 424 (in conjunction with test 426) regarding the authorization code entered in relation to the record which is to be updated, and the date of the record to be updated. If the authorization code is incorrect or the date entered does not yet contain an entry to be amended, an appropriate error message is developed at 428 and forwarded to formatter 40 for display at the data terminal 5. If all is in good order, the record is updated at 430, and a message is forwarded to formatter 40 for display at the data terminal 5, to provide an indication that the record has been amended.

Figure 14B:
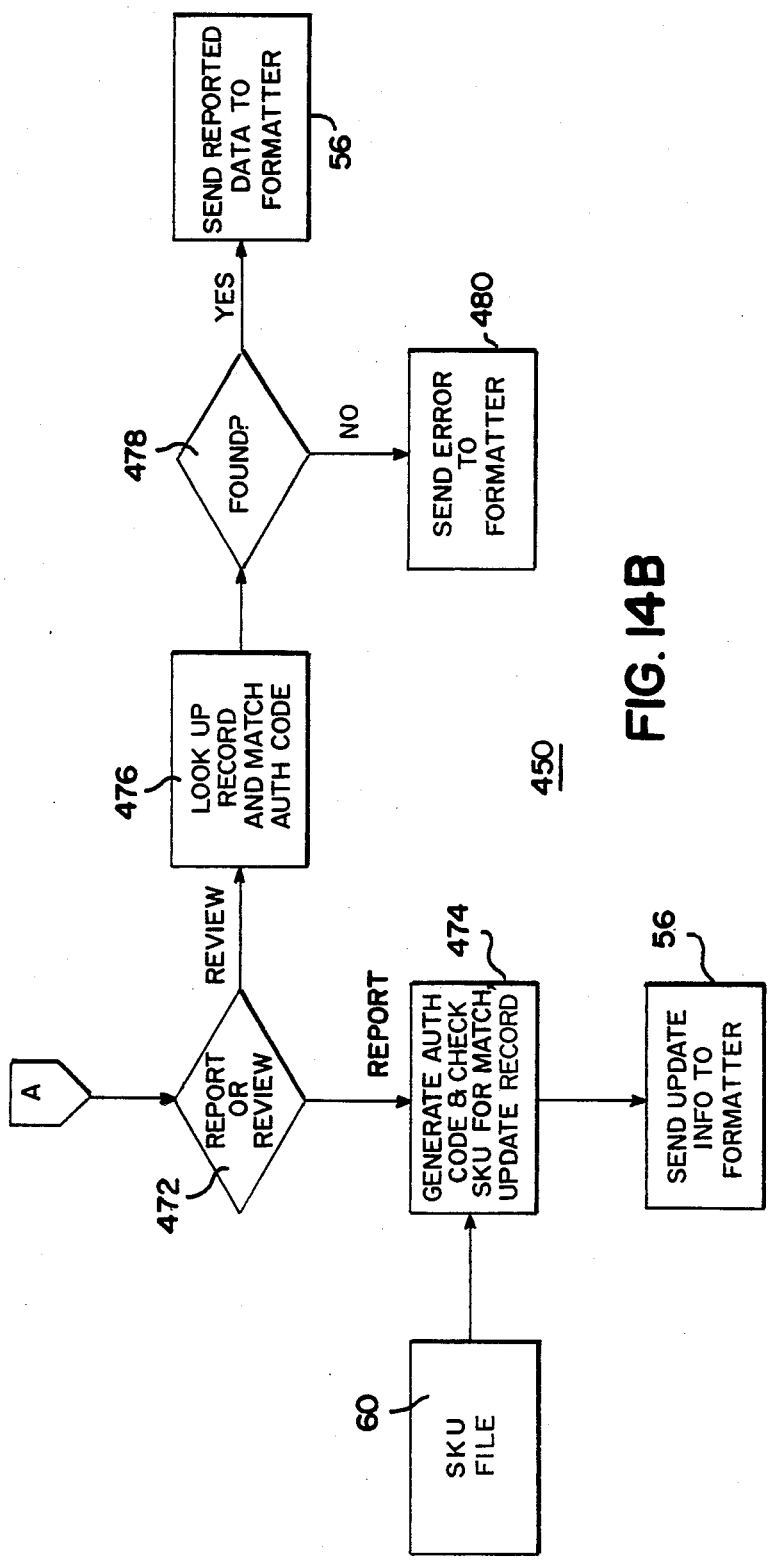

Another such ancillary function is inventory tracking, and an inventory processing server 450 which is capable of providing such a capability is illustrated in FIGS. 14A and 14B. Again, inventory server 450 receives its input from scheduler 46, and is accessed by the entry of an appropriate transaction code. In response, the site (site file 38) and inventory records (data base 60) are accessed at 452, and a test 454 is performed to determine whether or not the records sought have been located. If not, an error message is developed at 456 and is delivered to formatter 40 for appropriate display at the data terminal 5. If the records are located, the various fields entered in connection with the inventory processing server 450 are edited at 458. Such data may include, for example, the date, the product SKU (identification) number, pricing information, quantity information, store identification, etc. A test 460 is performed to verify that each of the various fields entered are valid. If not, an appropriate error message is developed at 462 and is forwarded to formatter 40 for display at the data terminal 5. If all fields are found to be valid, a threshold determination is made at 464 as to the type transaction which is to be processed, e.g., goods sold, at 466, goods ordered, at 468, and goods on hand, at 470. After determining the type of transaction involved, a determination is made at 472 as to whether the entry involved is a report or a review.

If a report, an authorization code is developed at 474 and the SKU number entered is matched against an inventory maintained in data base 60 of valid numbers for products kept on hand. If the SKU number is found to be valid, the report is updated and a message is forwarded to formatter 40 for appropriate display at data terminal 5, to provide an indication that the report has been entered.

In the event that it is desired to review an entered report, the authorization code entered is verified, and a search is made for the report involved, at 476. A test is performed at 478, and if all is in good order, the data to be reviewed is delivered to formatter 40 for display to the operator at the data terminal 5. If an error is detected, an error message 480 is developed and forwarded to formatter 40 for appropriate display at the data terminal 5.

It will be understood that various changes in the details, materials and arrangement of parts which have been herein described and illustrated in order to explain the nature of this invention may be made by those skilled in the art within the principle and scope of the invention as expressed in the claims which follow. This may include modification of the various operational elements previously described, as well as the addition or deletion of operational elements described above for use in connection with a financial transaction system in accordance with the present invention.

What is claimed is:

1. A financial transaction system, for processing data representing a series of transactions requiring authorization from a credit agency which maintains a data base containing information for designating approval or denial of credit transactions, said system comprising:

means for entering the data representing each of said series of transactions into the system for authorization, and for journaling at least the data relating to financial amount of each of the transactions entered;

means in association with said data base for accessing said data base responsive to data representing an operative transaction among data representing the series of transactions entered;

means in association with said data base for receiving authorization information from said data base in response to said accessing, and for displaying said authorization information as part of said processing; and means for capturing journalled data representing complete and incomplete transactions among said series of transactions, for tallying only journalled data representing complete transactions among said series of transactions over a predetermined interval of time as another part of said processing and for closing out the tallied data in preparation for journalling new data over the next predetermined interval of time.

2. The system of claim 1 wherein said entering means comprises at least one terminal means, and said accessing means comprises central processing means adapted for commmunication with said data base in communication with said terminal means.

3. The system of claim 2 wherein said terminal means includes said displaying means, and said data representing an operative transaction is entered into said system via said terminal means, responsive to descriptive prompts displayed by said displaying means.

4. The system of claim 3 wherein said data representing an operative transaction includes pricing information, and said prompts elicit said pricing information more than once for a given transaction, for comparison of successive representations of the elicited pricing information for that transaction.

5. The system of claim 2 wherein said credit transactions are initiated by means of credit card, and said terminal means includes means for automatically reading an indentifying number associated with a credit card.

6. The system of claim 1 wherein the processed series of transactions include credit transactions involving credit card and personal checking accounts, and a plurality of data bases are maintained which contain information relating to the different types of credit transactions, and each of said data bases is accessible by said accessing means.

7. The system of claim 1 wherein said accessing means further comprises means for assigning said operative transaction with an identifying reference number.

8. The system of claim 7 wherein said authorization receiving means further comprises means for assigning said operative transaction with an identifying authorization code indicative of the authorization information received from said data base.

9. The system of claim 1 wherein
said capturing means includes means for completing the journalled data representing all incomplete transactions processed over said predetermined interval of time.

10. The system of claim 9 wherein
said entering means comprises at least one terminal means, and
said tallying means comprises means for isolating a batch consisting of data representing all transactions entered by said terminal means over said predetermined interval of time.

11. The system of claim 10 wherein
said batch isolating means and said capturing means are updated in response to authorization information received from said data base.

12. The system of claim 10 wherein
said means for isolating data contained in said batch comprises means for closing said batch to retain the data representing the batch of completed transactions entered from said terminal means in said predetermined interval of time and to condition said capturing means for entry of data representing new transactions in the next predetermined interval of time.

13. The system of claim 12 which further comprises means for assigning said closed batch an identifying reference number.

14. The system of claim 12 wherein
said batch closing means comprises means for settling said closed batch to balance the transactional entries contained therein, and for thereupon indicating that said batch is balanced for payment.

15. The system of claim 14 wherein
said batch closing means further comprises means for tallying the data representing transactional entries in said isolated batch.

16. The system of claim 15 wherein
said settling means further comprises means for comparing an external tally of data representing transactions entered from said terminal means with said tally of entries in said isolated batch.

17. The system of claim 16 wherein said isolated batch is marked settled if said tallies coincide.

18. The system of claim 12 further comprising
means for storing the respective batch of data representing periodic trnasactional entries from each of said terminal means, and wherein
said capturing means further comprises means for accessing data contained in said storage means.

19. The system of claim 18 wherein
said storage means are accessed in accordance with an identifying reference number assigned to said operative transaction.

20. The system of claim 18 wherein
said capturing means further comprises means for modifying data contained in said storage means.

21. The system of claim 1 further comprising
means for limiting operative transactions to transactions incorporating data representing an enabling password.

22. The system of claim 1 wherein said accessing means only accesses said data base for operative transactions which exceed a selected minimum amount.

23. The system of claim 22 wherein operative transactions having amounts less than said selected minimum are authorized by said system without accessing said data base.

24. The system of claim 1 which further comprises means for monitoring daily cash flow developed responsive to said capturing means, to develop a daily cash flow report.

25. The system of claim 24 which further comprises means for modifying said daily cash flow report.

26. The system of claim 1 further comprising
means for monitoring inventories from which said transactions are developed.

27. A method for prcessing a series of financial transactions requiring authorization from a credit agency which maintains a data base containing information regarding the approval and denial of credit transactions, said method comprising the steps of:
entering digital data representative of each of said series of transactions as each transaction occurs, over a predetermined period of time, into an electronic system communicating with said data base,
journalling at least a part of the data representative of each of the transactions entered,
accessing said data base upon entry of data representative of each operative transaction forming part of the series of transactions entered, to elicit information from said data base as to whether the respective operative transaction represented by the entered data is approved or denied,
displaying the elicited information respecting each operative transaction as part of said processing, within the time interval required for accessing and eliciting said information from said data base immediately following entry of data representative of the respective operative transaction,
capturing entered data representative of both complete and incomplete transactions among said journalled series of transactions,
tallying only the captured data representative of said complete transactions, and reconciling all of the data captured over said predetermined period of time as another part of said processing, and
eliminating the data captured over said predetermined period of time by distribution thereof together with indicia representative of the source of said transactions through said system to the respective data base for automatic authorization of payment to said source for approved completed transactions represented among the distributed captured data, in preparation for entry of data representative of new transactions into said system over the next predetermined period of time.

28. Apparatus for processing financial transactions representing prospective purchases of goods and services for which authorization is dependent on current status of customer credit and/or checking account information contained in data bases from which such authorization may be approved or denied, said apparatus comprising
point of sale terminal means for entering data identifying the prospective customer and transaction,
central processing means communicating with said point of sale terminal means, for accessing said data bases to obtain information as to whether authorization for the respective transaction is approved or denied and for furnishing same to said point of sale terminal means, means responsive to said acccessed authorization information for compiling and storing data representing successive approved transactions respectively entered from each said point of sale terminal means over a predetermined time interval, and means responsive to instructional data entered from a respective point of sale terminal means, for reconciling data representing approved transactions compiled in said data storing means over said predetermined time interval from said respective point of sale terminal means, and responsive to reconciliation for authorizing payment for the transactions covered thereby.

29. Apparatus according to claim 28, wherein said data reconciling means includes means for data manipulation to complete the data for any transactions represented by incomplete data within said data storing means at the end of said predetermined time interval.

30. Apparatus according to claim 29, wherein said data reconciling means further includes means for denoting errors in data compiled within said data storing means, and for withholding payment authorization pending correction of said errors.

* * * * *